United States Patent
Koyanagi et al.

(10) Patent No.: US 6,451,910 B1
(45) Date of Patent: Sep. 17, 2002

(54) ACRYLIC PREMIX, ACRYLIC ARTIFICIAL MARBLE AND PRODUCTION METHOD THEREOF

(75) Inventors: Seiya Koyanagi; Shinji Saiki; Yuichiro Kishimoto, all of Aichi (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/698,046

(22) Filed: Oct. 30, 2000

Related U.S. Application Data

(63) Continuation of application No. PCT/JP99/02225, filed on Apr. 27, 1999.

(30) Foreign Application Priority Data

| Apr. 28, 1998 | (JP) | 10-118977 |
| Apr. 28, 1998 | (JP) | 10-118978 |
| Apr. 28, 1998 | (JP) | 10-118979 |
| Apr. 28, 1998 | (JP) | 10-118980 |
| Sep. 8, 1998 | (JP) | 10-253678 |

(51) Int. Cl.$^7$ .......................... C08K 5/11; C08K 3/26; C08K 3/10

(52) U.S. Cl. .................. 524/854; 524/314; 524/425; 524/434; 524/492; 524/494

(58) Field of Search ................... 524/314, 425, 524/434, 492, 494, 854

(56) References Cited

U.S. PATENT DOCUMENTS

| 5,149,776 A | 9/1992 | Kushi et al. |
| 5,356,754 A | 10/1994 | Kushi et al. |
| 6,028,127 A * | 2/2000 | Yanagase et al. ........... 524/409 |

FOREIGN PATENT DOCUMENTS

| JP | 3-257048 | 11/1991 |
| JP | 5-078545 | 3/1993 |
| JP | 9-111084 | 4/1997 |

\* cited by examiner

Primary Examiner—Kriellion A. Sanders
(74) Attorney, Agent, or Firm—Oblon, Spivak, McClelland, Maier & Neustadt, P.C.

(57) ABSTRACT

An acrylic premix comprising 10 to 90% by weight of (A) an acrylic resin composition consisting of an acrylic mono-functional monomer (a1), an acrylic poly-functional monomer (a2) containing at least one compound represented by any of the following general formulae (I) to (IV), and an acrylic polymer (b); 10 to 90% by weight of an inorganic filler (B); and 0.01 to 10 parts by weight of a curing agent (C) based on 100 parts by weight of the total amount of the components (A) and (B); acrylic artificial marble using the same; and a method for producing the same. The premix is useful for providing an acrylic SMC or BMC having excellent molding property at high temperature, molding processability, thickening property and storage stability.

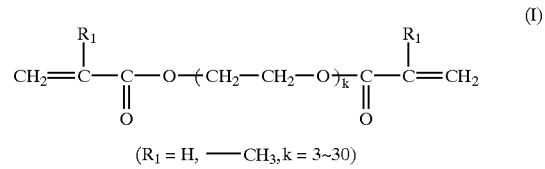

($R_1$ = H, —$CH_3$, k = 3~30)

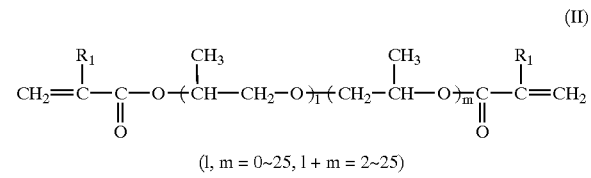

(l, m = 0~25, l + m = 2~25)

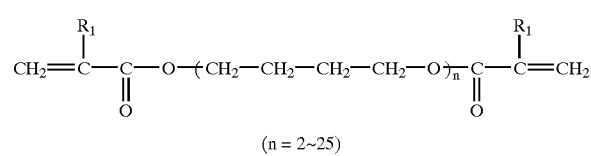

(n = 2~25)

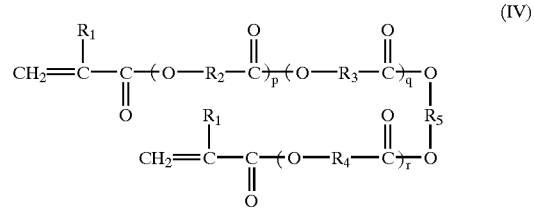

($R_2$~$R_5$ = C1–10 alkylene, p, q, r = 0~10, p + q + r = 2~25)

35 Claims, 1 Drawing Sheet

ACRYLIC PREMIX, ACRYLIC ARTIFICIAL MARBLE AND PRODUCTION METHOD THEREOF

This application is a Continuation of international PCT application no. PCT/JP99/02225, filed on Apr. 27, 1999, pending.

BACKGROUND OF THE INVENTION

1. Field of the Invention

The present invention relates to an acrylic premix which can provide an acrylic SMC (sheet molding compound) or BMC (bulk molding compound) which is suited for molding at high temperature and has excellent molding processability, thickening property and storage stability; acrylic artificial marble excellent in appearance and impact resistance; and a method for producing acrylic artificial marble which gives high productivity.

2. Description of the Background

Acrylic artificial marble prepared by compounding inorganic fillers such as aluminum hydroxide and the like into an acrylic resin has various prominent functions and properties such as excellent appearance, soft feeling, weatherability and the like of a molded article and is widely used for counters such as a kitchen counter and the like, washing and dressing stands, waterproof pan, and other architectural uses. These are usually produced by a casting method in which a so-called premix prepared by dispersing inorganic fillers into an acrylic syrup composed of acrylic monomers containing methyl methacrylate and of an acrylic polymer is filled into a mold, and this is cured and polymerized at relatively lower temperature.

For example, Japanese Patent Application Publication (JP-B) No. 4-58423 disclosed artificial marble molded article excellent in heat-resistance and flexibility obtained by a casting method wherein a premix comprising aluminum hydroxide and syrup components composed of a methacrylate, aromatic vinyl compound and specific polyalkylenepolyol di(meth)acrylate is cured for long period of time (3 hours) at a temperature of 80° C.

However, since this acrylic syrup has a lower boiling point, the curing temperature has to be lowered, which requires longer molding time leading to lower productivity. For example, when the curing temperature is 90° C. or more to shorten molding time, the above-described acrylic syrup bumps and smoothness of the resulting molded article significantly decreases. In a casting method, due to scarce pressure applied, when a molded article having complicated form is to be produced, a premix tends to cause filling failure in a mold and form of a molded article is restricted.

For improving these defects, there has been conventionally effected investigation for producing acrylic artificial marble by heat and press molding at 100° C. or more of SMC or BMC obtained by adding a thickening agent to such a resin syrup.

For example, Japanese Patent Application Laid-Open (JP-A) No. 6-298883 discloses an acrylic BMC for artificial marble excellent in low shrinkage property in heat-curing, prepared by compounding a thermoplastic acrylic resin powder which is poorly soluble in an acrylic syrup. Japanese Patent Application Laid-Open (JP-A) No. 6-313019 discloses an acrylic BMC for artificial marble produced by compounding into an acrylic syrup a resin powder prepared by spray-drying a cross-linked polymer obtained by emulsion polymerization, cracking in molding the BMC being prevented and appearance and thickening stability of a molded article made of the BMC being improved.

However, when these resin powders are used as a thickening agent, there is a problem that aging of a premix used for obtaining an acrylic BMC tends to require longer time (about 24 hours) and productivity lowers.

When the acrylic BMC as disclosed in Japanese Patent Application Laid-Open (JP-A) Nos. 6-298883 and 6-313019 is molded by curing at a high temperature of 100° C. or more for short period of time for enhancing productivity, there is a problem that the resulting artificial marble has decreased impact resistance.

When a BMC obtained by adding a thickening agent to a premix disclosed in Japanese Patent Application Publication (JP-B) No. 4-58423 is press-molded with heating at high temperature, there is a problem that the resulting artificial marble has lower deflection temperature under load, therefore, a molded article is deformed when released from a mold and deficiencies such as whitening and deforming tend to occur.

SUMMARY OF THE INVENTION

An object of the present invention is to provide an acrylic premix which can provide an acrylic SMC (sheet molding compound) or BMC (bulk molding compound) which is suited for molding at high temperature and has excellent molding processability, thickening property and storage stability; acrylic artificial marble excellent in appearance and impact resistance; and a method for producing acrylic artificial marble which gives high productivity.

The present inventors have intensively investigated for attaining the above-described object, and as a result, have found that excellent effects can be obtained by compounding an acrylic poly-functional monomer having specific structure, completing the present invention.

Namely, the present invention relates to an acrylic premix comprising 10 to 90% by weight of an acrylic resin composition (A) comprising an acrylic mono-functional monomer (a1), an acrylic poly-functional monomer (a2) containing at least one compound represented by any of the following general formulae (I) to (IV), and an acrylic polymer (b); 10 to 90% by weight of an inorganic filler (B); and 0.01 to 10 parts by weight of a curing agent (C) based on 100 parts by weight of the total amount of the acrylic resin composition (A) and the inorganic filler (B); acrylic artificial marble obtained by curing this acrylic premix; and a method for producing acrylic artificial marble comprising curing this acrylic premix with pressing and heating at a temperature from 90° C. to 150° C.

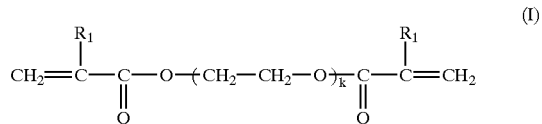

(in the formula (I), $R_1$ represents a hydrogen atom or a methyl group, and k represents an integer from 3 to 30.),

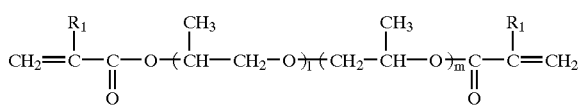

(II)

(in the formula (II), $R_1$ represents a hydrogen atom or a methyl group, and each of l and m represents an integer from 0 to 25 and l+m is 2 to 25.),

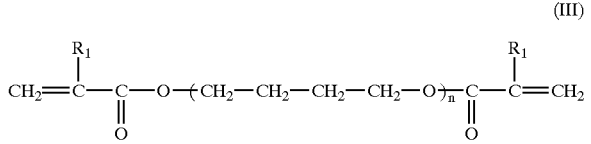

(III)

(in the formula (III), $R_1$ represents a hydrogen atom or a methyl group, and n represents an integer from 2 to 25.),

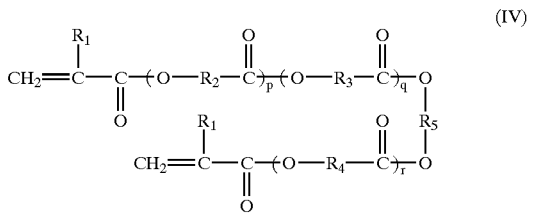

(IV)

(in the formula (IV), $R_1$ represents a hydrogen atom or a methyl group, $R_2$ to $R_5$ represent an alkylene group having 1 to 10 carbon atoms, and each of p, q and r represents an integer from 0 to 10 and p+q+r is 2 to 25).

DETAILED DESCRIPTION OF THE PREFERRED EMBODIMENTS

Figure 1:
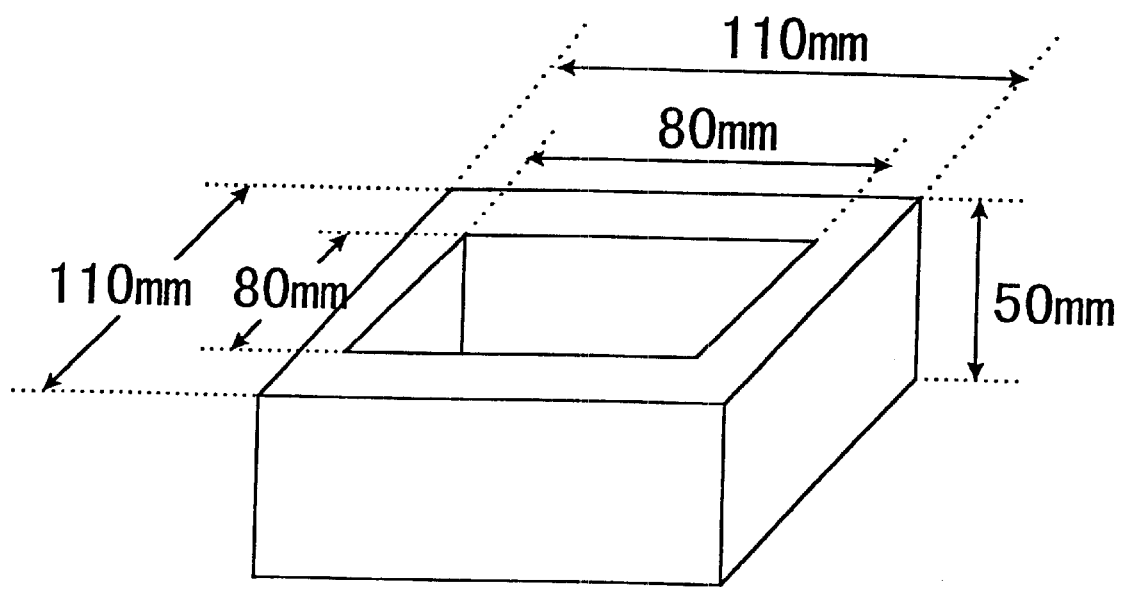
FIG. 1 is a schematic view showing a frame made of SUS used in measuring falling ball impact height.

The acrylic resin composition (A) used in the present invention comprises an acrylic mono-functional monomer (a1), an acrylic poly-functional monomer (a2) and an acrylic polymer (b).

The amount used of the acrylic resin composition (A) is in the range from 10 to 90% by weight based on the total amount of the acrylic premix of the present invention.

The reason for this is that when the content of the component (A) is 10% by weight or more, there are tendencies that flowability in molding an acrylic premix is excellent, loose holes and whitening are not formed even if a molded article in complicated form is made, and gloss and impact-resistance of the resulting molded article are excellent. Another reason for this is that when the content of the component (A) is 90% by weight or less, there are tendencies that shrinkage rate in curing decreases, and appearance of a molded article having deep texture specific to marble (clear feeling) is obtained in this range. The lower limit of this content is preferably 20% by weight or more, particularly preferably 30% by weight or more. The upper limit of this content is preferably 80% by weight or less, particularly preferably 60% by weight or less.

The acrylic mono-functional monomer (a1) constituting the acrylic resin composition (A) is not particularly restricted providing it is a mono-functional monomer having a methacryloyl and/or acryloyl group or a mixture thereof. Examples thereof include methyl (meth)acrylate, alkyl (meth)acrylates having 2 to 20 carbon atoms, hydroxyalkyl (meth)acrylates having a hydroxyalkyl group having 1 to 20 carbon atoms, (meth)acrylates having an ester group carrying an aromatic ring such as benzyl (meth)acrylate and the like, (meth)acrylates having an ester group carrying a cyclohexane ring such as cyclohexyl (meth)acrylate and the like, (meth)acrylates having an ester group carrying a bicyclo ring such as isobornyl (meth)acrylate and the like, (meth) acrylates having an ester group carrying a tricyclo ring such as tricyclo[$5.2.1.0^{2,6}$]decanyl (meth)acrylate and the like, (meth)acrylates having an ester group carrying a fluorine atom such as 2,2,2-trifluoroethyl (meth)acrylate and the like, (meth)acrylates having an ester group having cyclic ether structure such as glycidyl methacrylate, tetrahydrofurfuryl (meth)acrylate and the like, (meth)acrylic acid, (meth) acrylic acid metal salt, (meth)acrylamide, as well as other acrylic mono-functional monomers. These may be optionally used alone or in combination of two or more. In this specification, "(meth)acrylate" means "acrylate and or methacrylate".

Further, the acrylic resin composition (A) may contain mono-functional monomers other than acrylic mono-functional monomers, such as aromatic vinyl compounds like styrene and the like, vinyl acetate, (meth)acrylonitrile, vinyl chloride, maleic anhydride, maleic acid, maleates, fumaric acid, fumarates and the like, in addition to the acrylic mono-functional monomer (a1). These various mono-functional monomers may be optionally used alone or in combination of two or more.

Use of methyl methacrylate in particular as the acrylic mono-functional monomer (a1) is preferable since then the resulting molded article may tend to be endowed with deep texture specific to marble (clear feeling). Also, use of methyl methacrylate together with at least one (meth)acrylate selected from (meth)acrylates having an ester group carrying a hydroxyalkyl group having 2 to 6 carbon atoms, (meth) acrylates having an ester group carrying a benzene ring, (meth)acrylates having an ester group carrying a cyclohexane ring, (meth)acrylates having an ester group carrying a bicyclo ring, (meth)acrylates having an ester group carrying a tricyclo ring, (meth)acrylates having an ester group carrying a fluorine atom and (meth)acrylates having an ester group having cyclic ether structure is further preferable since then gloss unevenness on a molded article tends to decrease.

The content of the component (a1) is not particularly restricted, and preferably in the range from 1 to 50% by weight based on the total amount of the acrylic premix of the present invention. The lower limit of the content of the component (a1) is more preferably 5% by weight or more, and the upper limit thereof is preferably 30% by weight or less. When methyl methacrylate is allowed to be contained in the component (a1), the content of methyl methacrylate is preferably in the range from 1 to 20% by weight based on the total amount of the acrylic premix of the present invention, and the lower limit of the content of methyl methacrylate is more preferably 5% by weight or more, and the upper limit thereof is preferably 15% by weight or less.

The acrylic poly-functional monomer (a2) constituting the acrylic resin composition (A) is an acrylic poly-functional monomer containing at least one compound represented by any of the above-described general formulae (I) to (IV).

When the acrylic poly-functional monomer (a2) contains at least one compound represented by any of the above-described general formulae (I) to (IV), a molded article can be endowed with excellent impact-resistance, high gloss, high deflection temperature under load and hot water-resistance. Among other, use of at least one compound represented by any of the above-described general formulae (II) to (IV) is preferable since then particularly hot water-resistance of a molded article is excellent.

In the general formula (I), k is required to be 3 to 30. The reason for this is that when k is in this range, impact-resistance of a molded article is excellent. The lower limit of k is preferably 10 or more, more preferably 12 or more. The upper limit of k is preferably 28 or less, more preferably 25 or less. When compounds represented by the general formula (I) are used alone, k of 4 or less is preferable since then deflection temperature under load and gloss of a molded article tend to be higher, molding property at a high temperature of 90° C. or more tends to be excellent and hot water-resistance of a molded article also tends to be excellent, and particularly k of 3 is more preferable since then deflection temperature under load of a molded article is higher.

In the general formula (II), it is necessary the l+m is in the range from 2 to 25. The reason for this is that when l+m is 2 or more, impact-resistance of a molded article is excellent, and when l+m is 25 or less, deflection temperature under load and gloss of a molded article are higher enabling molding at a high temperature of 90° C. or more. Further, when l+m is 25 or less, hot water-resistance of a molded article is excellent. The lower limit of l+m is preferably 3 or more, more preferably 5 or more. The upper limit of l+m is preferably 15 or less, more preferably 10 or less.

In the general formula (III), it is necessary that n is in the range from 2 to 25. The reason for this is that when n is 2 or more, impact-resistance of a molded article is excellent, and when n is 25 or less, deflection temperature under load and gloss of a molded article are higher enabling molding at a high temperature of 90° C. or more. Further, when n is 25 or less, hot water-resistance of a molded article is excellent. The lower limit of n is preferably 3 or more, more preferably 4 or more. The upper limit of n is preferably 15 or less, more preferably 10 or less.

In the general formula (IV), it is necessary that p+q+r is in the range from 2 to 25. The reason for this is that when p+q+r is 2 or more, impact-resistance of a molded article is excellent, and when p+q+r is 25 or less, deflection temperature under load and gloss of a molded article are higher enabling molding at a high temperature of 90° C. or more. The lower limit of p+q+r is preferably 3 or more. The upper limit of p+q+r is preferably 15 or less, more preferably 10 or less, most preferably 7 or less.

In the general formula (IV), $R_2$ to $R_5$ represent an alkylene group having 1 to 10 carbon atoms. Particularly, a pentylene group, dimethylethylene group and dimethylpropylene group are preferable.

As the acrylic poly-functional monomer (a2), compounds represented by any of the general formulae (I) to (IV) may be used alone or in combination of two or more. Further, other acrylic poly-functional monomer may be used together with one compound represented by any of the general formulae (I) to (IV).

Examples of the other acrylic poly-functional monomer include a compound represented by the general formula (I) wherein k is 1, ethylene glycol di(meth)acrylate; a compound represented by the general formula (I) wherein k is 2, diethylene glycol di(meth)acrylate; a compound represented by the general formula (I) wherein k is 31 or more, poly-ethylene glycol di(meth)acrylate; a compound represented by the general formula (II) wherein l+m is 1, propylene glycol di(meth)acrylate; a compound represented by the general formula (II) wherein l+m is 26 or more, polypropylene glycol di(meth)acrylate; a compound represented by the general formula (III) wherein n is 1,1,4-butylene glycol di(meth)acrylate; compounds represented by the general formula (III) wherein n is 26 or more, polybutylene glycol di(meth)acrylate, 1,3-butylene glycol di(meth)acrylate, neopentyl glycol di(meth)acrylate, 1,6-hexanediol di(meth)acrylate, 1,9-nonanediol di(meth)acrylate, 1,10-decanediol di(meth)acrylate, dimethylolethane di(meth)acrylate, 1,1-dimethylolpropane di(meth)acrylate, trimethylolethane tri(meth)acrylate, trimethylolpropane tri(meth)acrylate, tetramethylolmethane tri(meth)acrylate, tetramethylolmethane di(meth)acrylate, and, poly-valent esters of (meth)acrylic acid with poly-valent alcohols [for example, pentaerythritol, dipentaerythritol and the like], allyl (meth)acrylate, and the like. Further, the acrylic resin composition (A) may also contain poly-functional monomers other then acrylic poly-functional monomers, such as divinylbenzene, triaryl isocyanurate and the like, in addition to the acrylic poly-functional monomer (a2). These various poly-functional monomers may be optionally used alone or in combination of two or more.

Use of at least one monomer selected from ethylene glycol di(meth)acrylate, diethylene glycol di(meth)acrylate, triethylene glycol di(meth)acrylate, tetraethylene glycol di(meth)acrylate, 1,3-butylene glycol di(meth)acrylate, 14,-butylene glycol di(meth)acrylate, neopentyl glycol di(meth) acrylate and trimethylol-propane tri(meth)acrylate as the other acrylic poly-functional monomer together with at least one compound represented by any of the general formulae (I) to (IV) is preferable since then deflection temperature under load and gloss of the resulting molded article tend to be higher and hot water-resistance tends to be further excellent as compared with the case wherein a compound represented by any of the general formulae (I) to (IV) is used alone.

Among them, particularly when a compound represented by the general formula (I) wherein k is an integer from 5 to 30 is used, it is preferable to use this compound together with at least one compound selected from the group consisting of ethylene glycol di(meth)acrylate, diethylene glycol di(meth)acrylate, triethylene glycol di(meth)acrylate, tetraethylene glycol di(meth)acrylate, 1,3-butylene glycol di(meth)acrylate, 1,4-butylene glycol di(meth)acrylate, neopentyl glycol di(meth)acrylate and trimethylolpropane tri(meth)acrylate. In this case, a molded article can be endowed with high impact-resistance, simultaneously with high deflection temperature under load and high gloss, molding at a high temperature of 90° C. or more is made possible, further, excellent hot water-resistance can be imparted to a molded article.

The content of at least one compound represented by any of the general formulae (I) to (IV) is not particularly restricted, and preferably in the range from 0.1 to 30% by weight based on the total amount of the acrylic premix of the present invention. When this content is 0.1% by weight or more, impact-resistance of a molded article tends to be excellent, and when it is 30% by weight or less, deflection temperature under load of a molded article tends to be higher. The lower limit of this content is preferably 0.5% by weight or more, particularly preferably 1% by weight or more. The upper limit of this content is preferably 20% by weight or less, particularly preferably 10% by weight or less.

The amount used of the acrylic poly-functional monomer (a2) is not particularly restricted, and preferably in the range from 0.1 to 30% by weight based on the total amount of the acrylic premix of the present invention. When the content of the component (a2) is 0.1% by weight or more, impact-resistance and gloss of a molded article tend to be excellent, and when it is 30% by weight or less, processability of a molded article tends to excellent. The lower limit of this content is more preferably 1% by weight or more, and the upper limit of this content is more preferably 20% by weight or less.

The acrylic polymer (b) constituting the acrylic resin composition (A) is a component which imparts to the acrylic premix of the present invention suitable viscosity, also is a thickening component which imparts to the acrylic premix of the present invention excellent viscosity providing excellent handling property without stickiness when the acrylic premix is used as a SMC or BMC, further is a component which imparts to a molded article made of the acrylic artificial marble of the present invention high strength.

As constituent components (monomers used for polymerization, and the like) of the acrylic polymer (b), there can be used for example the same compounds as the above-described acrylic mono-functional monomer (a1) and the other mono-functional monomer. As the acrylic polymer (b), there may be used a homopolymer obtained by homopolymerization of a monomer or a copolymer obtained by using two or more monomers together. If necessary, there may be used cross-linked polymers obtained by copolymerization of the above-described acrylic poly-functional monomer (a2) and other poly-functional monomer.

The content of the acrylic polymer (b) is not particularly restricted, and preferably in the range from 0.1 to 30% by weight based on the total amount of the acrylic premix of the present invention in view of handling property of the acrylic premix of the present invention, degree of thickening when this premix is used as an acrylic SMC or BMC, mechanical strength of the acrylic artificial marble of the present invention, and the like. When the content of the component (b) is 0.1% by weight or more, high thickening effect tends to be manifested, and handling property of the acrylic premix or acrylic SMC or BMC tends to be excellent. When the content of the component (b) is 30% by weight or less, kneading property of the acrylic premix or acrylic SMC or BMC tends to be excellent. The lower limit of this content is preferably 1% by weight or more, particularly preferably 5% by weight or more. The upper limit of this content is preferably 25% by weight or less, particularly preferably 20% by weight or less.

The acrylic polymer (b) may be a cross-linked polymer or non-cross-linked polymer and can be appropriately selected optionally, and it is preferable that the weight-average molecular weight thereof is in the range from 15,000 to 5,000,000 in view of flowability of the acrylic premix or the acrylic SMC or BMC of the present invention, and mechanical strength of the acrylic artificial marble of the present invention. The weight-average molecular weight herein referred to means a value in terms of polystyrene according to GPC and it is a value obtained by appropriately changing measuring conditions as described in the following examples depending on the range of the weight-average molecular weight.

The acrylic polymer (b) can be produced by a solution polymerization method, bulk polymerization method, emulsion polymerization method, suspension polymerization method and the like.

When the acrylic premix of the present invention is used as an acrylic SMC or BMC, a thickening agent is necessary. The thickening agent used is not particularly restricted, and there can be for example used a magnesium oxide powder, polymer powder and the like. Wherein, use of a polymer powder is preferable since then hot water-resistance of a molded article tends to be excellent.

When a polymer powder is used as a thickening agent, a part or all of the acrylic polymer (b) may be used as the thickening agent.

The polymer powder which can be used as a thickening agent is not particularly restricted and optionally can be selected appropriately. Among other, use of a polymer powder having a bulk density of 0.1 to 0.7 g/ml and an oil absorption of linseed oil of 60 to 200 ml/100 g as the acrylic polymer (b) is preferable since then thickening in a short period of time is realized and an acrylic SMC or BMC excellent in handling property and productivity is obtained.

When the bulk density of the polymer powder is 0.1 g/ml or more, there are tendencies that the polymer powder does not scatter easily, yield in the production is excellent, dusting in adding and mixing the polymer powder decreases, and workability becomes excellent. On the other hand, when the bulk density of the polymer powder is 0.7 g/ml or less, there are tendencies that sufficient thickening effect can be obtained with a small amount of the polymer powder used and thickening is carried out in a short period of time, therefore, productivity increases leading to advantage in cost. The lower limit of this bulk density is more preferably 0.15 g/ml, particularly preferably 0.2 g/ml or more. The upper limit thereof is more preferably 0.65 g/ml or less, particularly preferably 0.6 g/ml or less.

When the polymer powder has an oil absorption of linseed oil of 60 ml/100 g or more, there are tendencies that sufficient thickening effect can be obtained with a small amount of the polymer powder used and thickening is carried out in a short period of time, therefore, productivity increases leading to advantage in cost. On the other hand, when this oil absorption is 200 ml/100 g or less, kneading property in producing an acrylic SMC or BMC tends to be excellent since then dispersibility of the polymer powder becomes excellent. The lower limit of this oil absorption is more preferably 70 ml/100 g or more, particularly preferably 80 ml/100 g or more. The lower limit thereof is more preferably 180 ml/100 g or less, particularly preferably 160 ml/100 g or less.

The degree of swelling by methyl methacrylate of the polymer powder is not particularly restricted, and preferably 1-fold or less or 20-fold or more. When this degree of swelling is 1-fold or less or 20-fold or more, there are tendencies that speed of dissolving into the acrylic mono-functional monomer (a1) and/or acrylic poly-functional monomer (a2) increases, thickening speed increases, accordingly thickening in a short period of time is possible and productivity of an acrylic BMC increases.

The degree of swelling herein referred to is given as follows. A polymer powder is charged into a 100 ml measuring cylinder, compacted by soft tapping several times by 5 ml, then, methyl methacrylate which has been cooled to 10° C. or less is charged therein so that the total amount reaches 100 ml, the mixture is stirred quickly so as to obtain whole uniformity, then, the measuring cylinder is kept in a constant temperature vessel at 25° C. for 1 hour, the volume of the polymer layer (polymer containing methyl methacrylate) at that time is measured and the ratio of this value to volume (5 ml) of the original polymer powder layer.

Therefore, when a polymer powder only swells under this condition, a polymer layer (polymer powder containing methyl methacrylate) after kept under this condition grows more than 5 ml, and the degree of swelling will be a limited value over 1.

When a polymer powder is dissolved completely in this condition, the whole volume of 100 ml after kept under this condition can be regarded as a polymer layer containing methyl methacrylate, and this polymer layer containing methyl methacrylate depends on the volume of a measuring cylinder used, therefore in this case, the degree of swelling s defined as 20-fold or more.

Further, when a part of a polymer powder is dissolved and a part of this is not dissolved and remains under this condition, the volume of the remaining polymer layer (polymer layer containing methyl methacrylate) is regarded as the volume after swelling. Therefore, in this case, the degree of swelling is a value of 1 or less.

This polymer powder may be a non-cross-linked polymer powder or a cross-linked polymer powder, and preferably a non-cross-linked polymer powder. When the polymer powder is a non-cross-linked polymer powder, thickening speed tends to increase, thickening in a short period of time is possible and productivity of a BMC tends to increase. The non-cross-linked polymer powder herein referred to means a polymer powder at least of which surface part is constituted of a non-cross-linked polymer powder.

The polymer powder may have so-called core-shell structure composed of core phase and shell phase having mutually different chemical compositions, structures, molecular weights and the like of polymers constituting the phases. In this case, the core phase may be made of a non-cross-linked polymer or a cross-linked polymer, however, the shell phase is preferably made of a non-cross-linked polymer.

The weight-average molecular weight of the polymer powder used as a thickening agent is not particularly restricted. Wherein, it is preferable that the weight-average molecular weight of the polymer powder is 100,000 or more in view of balance between thickening effect and thickening time. The lower limit of this weight-average molecular weight of the polymer powder is preferably 300,000 or more, particularly preferably 500,000 or more. The upper limit thereof is preferably 5,000,000 or less, more preferably 4,500,000 or less, particularly preferably 4,000,000 or less.

The specific surface area of the polymer powder used as a thickening agent is not particularly restricted, and preferably in the range from 0.5 to 100 m$^2$/g. The reason for this is that when the specific surface area of the polymer powder is 0.5 m$^2$/g or more, there is tendency that sufficient thickening effect is obtained by use of a small amount of the polymer powder and thickening tends to be accomplished in a short period of time, leading to improved productivity. The reason for this is hypothesized that since this polymer powder has a large specific surface area as described above, the polymer is dissolved quickly into an acrylic mono-functional monomer (a1) and/or an acrylic poly-functional monomer (a2), obtaining thickening effect in a short period of time. Further, when this specific surface area is 100 m$^2$/g or less, dispersibility of the polymer powder in an acrylic mono-functional monomer (a1) and/or an acrylic poly-functional monomer (a2) is excellent, therefore, there is a tendencies that handling in thickening is excellent and kneading property in producing an acrylic premix is excellent. The lower limit of this specific surface area is more preferably 1 m$^2$/g or more, and the upper limit thereof is more preferably 80 m$^2$/g or less.

The average particle size of the polymer powder used as a thickening agent is not particularly restricted, and preferably in the range from 1 to 500 μm. When the average particle size is 1 μm or more, there is a tendencies that the polymer powder does not scatter easily and handling of the polymer powder is excellent, and when the average particle size is 500 μm or less, there is a tendency that appearance, particularly gloss and surface smoothness of the resulting molded article are excellent. The lower limit of this average particle size is more preferably 5 μm or more, particularly preferably 10 μm or more. The upper limit thereof is more preferably 350 μm or less, particularly preferably 200 μm or less.

The polymer powder used as a thickening agent is preferably a secondary agglomerate formed by agglomeration of primary particles. When the polymer powder is a secondary agglomerate, there are tendencies that absorption speed of an acrylic mono-functional monomer (a1) and/or an acrylic poly-functional monomer (a2) is high and thickening property is extremely excellent.

In this case, the average particle size of the primary particle of the polymer powder is preferably in the range from 0.03 to 1 μm. When this average particle size is in the range from 0.03 to 1 μm, there are tendencies that sufficient thickening effect is obtained with a small amount of the polymer powder used and thickening can be accomplished in a short period of time, leading to increase in productivity. The lower limit of the average particle size of the primary particle is more preferably 0.07 μm or more, and the upper limit thereof is more preferably 0.7 μm or less.

Production method of the polymer powder used as a thickening agent is not particularly restricted, and the polymer powder can be produced by a known polymerization method. Among them, a method in which an emulsion obtained by emulsion polymerization is subjected to spray drying, freeze drying, acid/salt coagulation and the like to obtain a polymer powder is preferable since a polymer powder having the above-described specific bulk density and oil absorption can be produced efficiently.

The inorganic filler (B) used in the present invention is a component which imparts marble-like deep texture (clearness) and heat-resistance to an acrylic artificial marble molded article obtained by molding the acrylic premix of the present invention.

The amount used of the inorganic filler (B) is in the range from 10 to 90% by weight based on the total amount of the acrylic premix of the present invention. When this amount used is 10% by weight or more, the resulting molded article has excellent texture, heat-resistance and the like, and shrinkage rate in curing decreases. On the other hand, when this amount used is 90% by weight or less, flowability in molding an acrylic premix and an acrylic SMC or BMC tends to be excellent, and the resulting acrylic artificial marble molded article has excellent gloss and impact-resistance. The lower limit of this amount used is more preferably 20% by weight or more, particularly preferably 30% by weight or more. The upper limit thereof is more preferably 80% by weight or less, particularly preferably 70% by weight or less.

The inorganic filler (B) is not particularly restricted, and there can be used, for example, aluminum hydroxide, silica, amorphous silica, calcium carbonate, barium sulfate, titanium oxide, calcium phosphate, talc, clay, mica, glass powder and the like. These may be optionally selected appropriately for use, and two or more may be used together. Among them, aluminum hydroxide, calcium carbonate, silica, amorphous silica, and glass powder are preferable in view of texture of the resulting molded article.

The curing agent (C) used in the present invention is not particularly restricted, and there can be used, for example, radical polymerization initiators such as organic peroxides, azo compounds, and the like.

The curing agent (C) is used in an amount of 0.01 to 10 parts by weight based on 100 parts by weight of the total amount of the acrylic resin composition (A) and the inorganic filler (B). When this amount used is 0.01 part by weight or more, curing property of the acrylic premix of the present invention is sufficient, and when it is 10 parts by weight or less, storage stability of the acrylic premix is excellent.

Specific examples of the curing agent (C) include organic peroxides such as bis(4-t-butylcyclohexyl) peroxydicarbonate (10 hours half life temperature=44° C.), t-hexyl peroxypivalate (10 hours half life temperature=53° C.), 3,5,5-trimethylhexanoyl peroxide (10 hours half life temperature=59° C.), lauroyl peroxide (10 hours half life temperature=62° C.), t-hexyl peroxy-2-ethyl hexanoate (10 hours half life temperature=70° C.), t-amyl peroxy-2-ethyl hexanoate (10 hours half life temperature=70° C.), benzoyl peroxide (10 hours half life temperature=72° C.), t-butyl perox-2-ethyl hexanoate (10 hours half life temperature=72° C.), t-butyl peroxyisobutyrate (10 hours half life temperature=77° C.), di-t-butyl perox-2-methylcyclohexane (10 hours half life temperature=83° C.), 1,1,3,3-tetramethylbutyl peroxy-3,5,5-trimethyl hexanoate (10 hours half life temperature=86° C.), 1,1-bis(t-amyl peroxy)3,3,5-trimethylcyclohexane (10 hours half life temperature=86° C.), 1,1-bis(t-hexyl peroxy)3,3,5-trimethylcyclohexane (10 hours half life temperature=87° C.), 1,1-bis(t-hexyl peroxy)cyclohexane (10 hours half life temperature=87° C.), 1,1-bis(t-butyl peroxy)3,3,5-trimethyl cyclohexane (10 hours half life temperature=90° C.), 1,1-bis(t-butyl peroxy)cyclohexane (10 hours half life temperature=91° C.), 2,2-bis(4,4-di-t-butyl peroxycyclohexyl)propane (10 hours half life temperature=95° C.), 1,1-bis(t-butyl peroxy)cyclododecane (10 hours half life temperature=95° C.), t-hexyl peroxyisopropyl carbonate (10 hours half life temperature=95° C.), t-amyl peroxy-3,5,5-trimethyl hexanoate (10 hours half life temperature=95° C.), t-butyl peroxy-3,5,5-trimethyl hexanoate (10 hours half life temperature=97° C.), 1,6-bis(t-butyl peroxycarbonyloxy)hexane (10 hours half life temperature=97° C.), diethylene glycol-bis(t-butyl peroxycarbonate) (10 hours half life temperature=97° C.), t-butyl peroxylaurate (10 hours half life temperature=98° C.), 2,5-dimethyl-2,5-di(toluoyl peroxy)hexane (10 hours half life temperature=99° C.), t-butyl peroxyisoropyl carbonate (10 hours half life temperature=99° C.), t-butyl peroxy-2-ethylhexyl carbonate (10 hours half life temperature=99° C.), t-hexyl peroxybenzoate (10 hours half life temperature=99° C.), t-amyl peroxybenzoate (10 hours half life temperature=100° C.), 2,5-dimethyl-2,5-di(benzoyl peroxy)hexane (10 hours half life temperature=100° C.), t-butyl peroxyacetate (10 hours half life temperature=102° C.), 2,2-bis(t-butyl peroxy)butane (10 hours half life temperature=103° C.), t-butyl peroxybenzoate (10 hours half life temperature=104° C.), n-butyl-4,4-bis(t-butyl peroxy)valeate (10 hours half life temperature=105° C.), dicumyl peroxide (10 hours half life temperature=106° C.), 1,3-bis(t-butyl peroxyisopropyl)benzene (10 hours half life temperature=121° C.) and the like; and azo compounds such as 2,2'-azobis-2,4-dimethylvaleronitrile (10 hours half life temperature=52° C.), 1,1'-azobis(1-acetoxy-1-phenylethane) (10 hours half life temperature=61° C.), 2,2'-azobisisobutyronitrile (10 hours half life temperature=65° C.), 2,2'-azobis-2-methylbutyronitrile (10 hours half life temperature=67° C.), dimethylazobis-2,2'-isobutyrate (10 hours half life temperature=67° C.), 1,1'-azobis-1-cyclohexanecarbonitrile (10 hours half life temperature=87° C.) and the like. These can be used alone or in combination of two or more.

As the curing agent (C), curing agents having a 10 hours half life time of 75° C. or more are preferable among other. When a curing agent having a 10 hours half life time of 75° C. or more is used, there is a tendency that curing of an acrylic premix in a short period of time is made possible and storage stability of an acrylic premix is excellent. If required, it is also possible to use a curing agent having a 10 hours half life time of less than 75° C. together with a curing agent having a 10 hours half life time of 75° C. or more.

The acrylic premix of the present invention comprises the above-described components (A) to (C) as basic constituent components, and a granite-like artificial marble molded article having grain pattern can be obtained by compounding an inorganic filler-containing resin particle (D) into the basic components and molding the mixture.

The amount used of the inorganic filler-containing resin particle (D) is not particularly restricted, and preferably in the range from 1 to 50% by weight based on the total amount of the acrylic premix. When this amount used is 1% by weight or more, grain pattern having excellent design tends to be obtained, and when it is 50% by weight or less, kneading property in producing the acrylic premix tends to be excellent. The lower limit of this amount used is more preferably 3% by weight or more, particularly preferably 5% by weight or more. The upper limit thereof is more preferably 40% by weight or less, particularly preferably 30% by weight or less.

The resin constituting the inorganic filler-containing resin particle (D) is not particularly restricted providing it is a resin which is not dissolved in methyl methacrylate, and examples thereof include cross-linked acrylic resins, cross-linked polyester resins, cross-linked styrene resins and the like. A cross-linked acrylic resin is preferable since it has high affinity with the acrylic resin composition (A) and a molded article having beautiful appearance is obtained using this resin. This cross-linked acrylic resin may be a resin containing a non-cross-linked acrylic polymer.

The content of the resin in the inorganic filler-containing resin particle (D) is not particularly restricted, and preferably in the range from 10 to 90% by weight based on the total amount of the component (D). When this content is 10 parts by weight or more, there is tendency that a molded article having higher strength can be obtained, and when it is 90 arts by weight or less, texture, heat-resistance and the like of the resulting molded article tend to be excellent.

Further, the total amount of the resin component in the inorganic filler-containing resin particle (D) and the acrylic resin composition (A) is preferably in the range from 10 to 90% by weight based on the total amount of the acrylic premix of the present invention. When this total amount is 10% by weight or more, there are tendencies that flowability in molding the acrylic premix is improved, loose holes and whitening are not easily formed even if a molded article in complicated form is made, and gloss and impact-resistance of the resulting molded article are excellent. When this total amount is 90% by weight or less, shrinkage rate in curing tends to lower. Further, when this total amount is in the range from 10 to 90% by weight, there is tendency that appearance of a molded article having marble-like deep texture (clearness) can be obtained. The lower limit of this total amount is preferably 20% by weight or more, particularly preferably 30% by weight or more. The upper limit thereof is more preferably 80% by weight or less, particularly preferably 60% by weight or less.

The inorganic filler constituting the inorganic filler-containing resin particle (D) is not particularly restricted, and there can be used for example a variety of the inorganic fillers listed above as examples of the inorganic filler (B). They can be used in combination of two or more. Further, there can be used different inorganic fillers from the inorganic filler-containing resin particle (D) and the inorganic filler (B).

The content of the inorganic filler in the inorganic filler-containing resin particle (D) is not particularly restricted, and preferably in the range from 10 to 90% by weight based on the total amount of the component (D). When this content is 10% by weight or more, texture, heat-resistance and the like of the resulting molded article tend to be excellent, and when it is 90 arts by weight or less, there is tendency that a molded article having higher strength can be obtained.

Further, the total amount of the inorganic filler in the inorganic filler-containing resin particle (D) and the inorganic filler (B) described above is preferably in the range from 10 to 90% by weight based on the total amount of the acrylic premix of the present invention. When this total amount is 10% by weight or more, there are tendencies that texture, heat-resistance and the like of the resulting molded article are excellent and shrinkage rate in curing lowers. On the other hand, when this total amount is 90% by weight or less, flowability in molding the acrylic premix or acrylic SMC or BMC is improved, and gloss and impact-resistance of the resulting molded article are excellent. The lower limit of this total amount is preferably 20% by weight or more, particularly preferably 40% by weight or more. The upper limit thereof is more preferably 80% by weight or less, particularly preferably 70% by weight or less.

The production method of the inorganic filler-containing resin particle (D) is not particularly restricted, and there is exemplified a method in which a resin molded article containing an inorganic filler obtained by polymerization and curing according to a heat press method, casting method and the like is ground, and the resulted ground particles are classified. For example, it is preferable that an acrylic artificial marble molded article so molded is ground and the resulted ground particles are classified.

In the present invention, as the inorganic filler-containing resin particle (D), one particle may be used or two or more particles having different colors and particle sizes may be used. The particle size of the inorganic filler-containing resin particle (D) is not particularly restricted, providing it is not more than the thickness of a molded article.

In the acrylic premix of the present invention, various additives can be added if required such as reinforcing agents like glass fiber, carbon fiber and the like; coloring agents; internal releasing agents; low shrinkage agents; polymerization inhibitors; and the like, in addition to the above-described components (A) to (D).

The mixing method of various constituent components for obtaining the acrylic premix of the present invention is not particularly restricted. For example, the above-described component (a1), component (a2), component (b), component (B), component (C), and if required component (D) and other additive components may be mixed at one time; or the component (a1) may be partially polymerized previously to form a component (b) as a polymerized material thereof in the component (a1), then, the remaining components may be mixed; or a part or all of the component (b) may be previously dissolved in the component (a1) and/or component (a2) to form a syrup, then, the remaining components may be mixed.

The apparatus for mixing various constituent components is not particularly restricted, and for example, a kneader, mixer, roll and the like can be used.

When a non-cross-linked polymer powder having the above-described specific bulk density and oil absorption is used as a thickening agent in thickening the acrylic premix of the present invention to obtain an acrylic SMC or BMC, it becomes possible to mix uniformly various constituent components and simultaneously thicken and extrude the mixture by a continuous twin screw kneader to make given form and to produce continuously an acrylic SMC and/or BMC, since the thickening time is extremely shorten by use of the above-described thickening agent.

The kneading time is not particularly restricted, and preferably within 10 minutes. When the kneading time is 10 minutes or less, there is tendency that storage stability of the acrylic premix is excellent since the total amount of the heat which the acrylic premix receives in kneading decreases. Further in this case, when the inorganic filler-containing resin particle (D) is compounded to produce a granite-like acrylic premix, there are tendencies that swelling and dissolution of the inorganic filler-containing resin particle (D) in the acrylic mono-functional monomer (a1) and/or acrylic poly-functional monomer (a2) are suppressed and the resulting artificial marble is endowed with clear grain pattern providing excellent appearance. When an acrylic SMC or BMC is produced as the acrylic premix by a continuous twin screw kneader, the kneading time is preferably 2 minutes or less, particularly preferably 1 minute or less. The lower limit thereof is not particularly restricted, and preferably 10 seconds or more, more preferably 20 seconds or more.

Since the acrylic SMC or BMC of the present invention is thickened to level revealing no stickiness in such a short period of time, handling thereof is excellent even immediately after discharged from a continuous twin screw kneader. Also this acrylic SMC or BMC may be subjected to press molding without aging after discharged from a continuous twin screw kneader, or if necessary, may be aged before press molding after discharged from a continuous twin screw kneader.

By curing the acrylic premix of the present invention, acrylic artificial marble can be produced having such excellent impact-resistance as an Izod impact value of 8.0 kJ/m$^2$ or more.

Further, by appropriately selecting the acrylic premix of the present invention, there can also be produced acrylic artificial marble having an Izod impact value of 10.0 kJ/m$^2$ or more.

Curing method of the acrylic premix is not particularly restricted, and the acrylic premix may be as it is heat-cured by a casting method or redox-cured, or the acrylic premix may be converted to an acrylic SMC or BMC using a thickening agent before heat and press curing. Among other, a method in which an acrylic premix is thickened to obtain an acrylic SMC or BMC which is then subjected to heat and press curing has high productivity and is preferable.

When the acrylic premix of the present invention is cured by a casting method, the deflection temperature under load of the acrylic artificial marble of the present invention is not particularly restricted, however, when the acrylic premix of the present invention is converted to an acrylic SMC or BMC before heat and press curing, the deflection temperature under load thereof is preferably 70° C. or more. When the deflection temperature under load of acrylic artificial marble is 70° C. or more, there is tendency that a molded article obtained by heat and press curing of an acrylic SMC or BMC can be taken out without deformation in taking out the molded article from a mold. The lower limit of this deflection temperature under load is more preferably 80° C. or more, particularly preferably 90° C. or more, most preferably 100° C. or more. The upper limit thereof is not particularly restricted, and preferably 130° C. or less, more preferably 120° C. or less.

When the acrylic premix of the present invention is converted to an acrylic SMC or BMC before heat and press curing to produce artificial marble, the production can be conducted by a known method such as a press molding method, transfer molding method, injection molding method, extrusion molding method and the like.

In this case, the heating temperature is not particularly restricted, and preferably in the range from 80 to 150° C. When the heating temperature is 80° C. or more, the curing time can be reduced and productivity tends to be higher, and when 150° C. or less, appearance of the resulting molded article tends to be excellent. The lower limit of this heating temperature is more preferably 90° C. or more, particularly preferably 105° C. or more. The upper limit thereof is more preferably 140° C. or less, particularly preferably 135° C. or less. Further, heat-curing may be conducted maintaining temperature difference between an upper mold and a lower mold in this temperature range.

The pressing value is preferably in the range from 1 to 20 MPa. When this pressing value is 1 MPa or more, filling property of an acrylic SMC or BMC into a mold tends to be excellent, and when 20 MPa or less, excellent appearance of a mold article tends to be obtained. The lower limit of the pressing value is more preferably 2 MPa or more, and the upper limit thereof is more preferably 15 MPa or less.

The molding time may be appropriately selected depending on the thickness of a molded article.

The following examples further illustrate the present invention specifically below. All parts and % in the examples are by weight. Evaluations of various physical properties were conducted according to the following methods.

[Physical Property of Polymer Powder]

Average particle size: It was measured using laser scattering particle size distribution analyzer (LA-910, manufactured by HORIBA Ltd.)

Bulk density: It was measured according to JIS R 6126-1970.

Oil absorption: It was measured according to JIS K 5101-1991, and time directly before a putty-like lamp is steeply softened with the last one drop of linseed oil was recognized as terminal point.

Specific surface area: It was measured by a nitrogen adsorption method using a surface area meter SA-6201 (manufactured by HORIBA Ltd.).

Weight average molecular weight: It is a value calculated in terms of polystyrene according to a GPC method, and was measured according to any of the following conditions depending on the range of the weight-average molecular weight.

In the case of a weight-average molecular weight of 100,000 or less:

Apparatus: High performance GPC apparatus HLC-8120, manufactured by Tosoh Corp.

Column: TSKgelG2000HXL and TSKgelG4000HXL are connected in series, manufactured by Tosoh Corp.

Oven temperature: 40° C.

Elution solution: Tetrahydrofuran

Sample concentration: 0.4% by weight

Flow rate: 1 ml/minute

Flow amount: 0.1 ml

Detector: RI (differential refractometer)

In the case of a weight-average molecular weight of 100,000 to 1,000,000:

Apparatus: High performance GPC apparatus HLC-8020, manufactured by Tosoh Corp.

Column: Three of TSKgelGMHXL are connected in series, manufactured by Tosoh Corp.

Oven temperature: 38° C.

Elution solution: Tetrahydrofuran

Sample concentration: 0.4% by weight

Flow rate: 1 ml/minute

Flow amount: 0.1 ml

Detector: RI (differential refractometer)

In the case of a weight-average molecular weight of 1,000,000 or more:

Apparatus: High performance GPC apparatus HLC-8020, manufactured by Tosoh Corp.

Column: Two of TSKgelGMHHR-H(30) are connected in series, manufactured by Tosoh Corp.

Oven temperature: 40° C.

Elution solution: Tetrahydrofuran

Sample concentration: 0.4% by weight

Flow rate: 1 ml/minute

Flow amount: 0.1 ml

Detector: RI (differential refractometer)

Since there is not polystyrene standard polymer having a weight-average molecular weight of over 20,000,000, when a sample having a weight-average molecular weight of 1,000,000 or more is used, a polystyrene calibration curve was extrapolated to the point of a weight-average molecular weight of 5,000,000,000.

Degree of swelling: A polymer powder was charged in a 100 ml measuring cylinder, the cylinder was tapped weakly several times to compact the powder to 5 ml, then, to this was charged methyl methacrylate cooled to 10° C. or lower so that the total amount was 100 ml, and the mixture was stirred quickly until the mixture became totally uniform, then, the measuring cylinder was kept in a thermostat at 25° C. for 1 hour, the volume of the polymer powder layer after swelling was measured, and the degree of swelling was represented by ratio to the volume (5 ml) of the polymer powder layer before swelling.

[Physical Properties of BMC (Acrylic Premix)]

Storage stability of BMC:

BMC obtained from an acrylic premix was placed in to a sealed vessel, stored in an atmosphere at 23° C. and the storage stability was evaluated according to the following criteria.

◯: It was not cured even after left for 3 months or more in atmosphere of 23° C., and storage stability was extremely excellent.

x: When it was left in atmosphere of 23° C., it was cured in 2 weeks.

Thickening property of BMC:
◯: It was thickened to be a dough-like material during kneading, no stickiness was recognized even directly after kneading, and handling property was extremely excellent.
x: It was not thickened during kneading, and directly after kneading, it was semi-liquid and sticky, and handling property thereof was extremely poor. Aging at 60° C. for 24 hours or more was required for thickening this semi-liquid premix to obtain a dough-like BMC.

[Physical Properties of Molded Article]

Releasing property of molded article:
◯: When a molded article was released from a mold, the molded article could be taken out without deformation.
x: When a molded article was released from a mold, the molded article was deformed and whitening occurred.

Gloss of molded article:
◎: Gloss was extremely excellent.
◯: Gloss was high.
Δ: Gloss was recognized.
x: Gloss was low.

Gloss unevenness of molded article:
◎: No unevenness in gloss was recognized at all.
◯+: No unevenness in gloss was recognized.
◯: Almost no unevenness in gloss was recognized.
x: Gloss parts and non-gloss parts were present, and unevenness was recognized in gloss.

Deflection temperature under load: It was determined according to JIS K-6911-1995. A 12.7 mm×127 mm plate was cut out from an artificial marble plate having a thickness of 3.2 mm to obtain a specimen having a width of 3.2 mm, a height of 12.7 mm and a length of 127 mm. Such weight was used that bending modulus was 1.80 N/mm$^2$.

Izod impact value: It was determined according to JIS K-7110-1984. A 12.7 mm×64 mm plate was cut out from an artificial marble plate having a thickness of 10 mm to obtain a specimen, and the edgewise impact value was determined without notch.

Falling ball impact height: A specimen of 100 mm×100 mm having a thickness of 10 mm was placed on a SUS frame as shown in FIG. 1, a steel ball (steel ball for ball bearing having a nominal diameter Dw=33.33750 mm described in JIS B1501-1988) having a weight of about 198 g was allowed to fall freely onto the center part of the specimen, and height when cracking occurred on the specimen was visually recognized was recorded as falling ball impact height.

Hot Water Resistance (Hot Water Resistance of Molded Article)

A molded plate was immersed in hot water of 80° C. for 120 hours, and color changes (whiteness, color difference) thereof were compared based on the plate before the immersion.

◎: Whiteness and color difference revealed no difference before and after immersion into hot water, and color change was extremely small.
◯+: Whiteness and color difference revealed almost no difference before and after immersion into hot water, and color change was fairly small.
◯: Whiteness and color difference revealed slight difference before and after immersion into hot water, however this difference was practically not problematical.
x: Whiteness and color difference revealed difference before and after immersion into hot water, and color difference was large.
xx: Whiteness and color difference revealed large difference before and after immersion into hot water, and color difference was very large.

(1) Production Example of Polymer Powder (P-1)

Into a reaction apparatus equipped with a cooling tube, thermometer, stirrer, dropping apparatus and nitrogen introducing tube was charged 925 parts of distilled water, sodium alkyldiphenyl ether disulfonate (trade name: "Pelex SS-H", manufactured by Kao Corp.) and 1 part of potassium persulfate, and the resulting mixture was heated at 70° C. with stirring under nitrogen atmosphere. To this was added a mixture composed of 500 parts of methyl methacrylate (trade name "Acry Ester M", manufactured by Mitsubishi Rayon Co., Ltd.) and 5 parts of sodium dialkylsulfosuccinate (trade name: "Pelex OT-P", manufactured by Kao Corp.) dropwise over 3 hours, then, kept for 1 hour, further heated up to 80° C. and kept for 1 hour for completing emulsion polymerization, to obtain an emulsion containing a polymer primary particle having an average particle size of 0.08 μm.

The resulted emulsion was spray-dried using a L-8 type spray drier manufactured by OHKAWARA KAKOHKI Co. Ltd. at inlet temperature/outlet temperature=150° C./90° C., to obtain a non-crosslinked polymer powder (P-1) containing a secondary agglomerate particle having an average particle size of 30 μm.

The resulted non-crosslinked polymer powder (P-1) had a weight-average molecular weight of 600,000, and was completely dissolved in methyl methacrylate and had a degree of swelling of 20-fold or more. Other physical properties are shown in Table 1.

(2) Production Example of Polymer Powder (P-2)

Into a reaction apparatus equipped with a cooling tube, thermometer, stirrer, dropping apparatus and nitrogen introducing tube was charged 800 parts of distilled water and 1 part of polyvinyl alcohol (degree of saponification: 88%, degree of polymerization: 1000) to prepare a solution, then, to this was added a monomer solution prepared by dissolving 2 parts of n-dodecyl-mercaptane and 2 parts of azobisisobutyronitrile into 400 parts of methyl methacrylate, and the mixture was heated up to 80° C. over 1 hour with stirring at 300 rpm under nitrogen atmosphere, and heated under same conditions for 2 hours. Then, the mixture was heated up to 90° C. and heated for 2 hours, then, cooled to room temperature for completion of the suspension polymerization. The resulted suspension was filtered and washed, then, dried by a hot air dryer at 50° C., to obtain a non-crosslinked polymer powder (P-2) having an average particle size of 350 μm.

The resulted non-crosslinked polymer powder (P-2) had a weight-average molecular weight of 40,000 and a degree of swelling by methyl methacrylate was 1.2. Other physical properties are shown in Table 1.

TABLE 1

| | Powdery property of polymer powder | | | | | | |
|---|---|---|---|---|---|---|---|
| Polymer powder | Average particle size of primary particle ($\mu$m) | Average particle size of secondary particle ($\mu$m) | Bulk density (g/ml) | Oil absorption (ml/100 g) | Degree of swelling (-fold) | Specific surface area (m$^2$/g) | weight-average molecular weight |
| P-1 | 0.08 | 30 | 0.40 | 100 | 20-fold or more | 51 | 600,000 |
| P-2 | | 350 | 0.73 | 45 | 1.2 | 0.07 | 40,000 |

(3) Production Example of Inorganic Filler-containing Resin Particle (D)

To an acrylic monomer mixture composed of 60 parts of methyl methacrylate (trade name "Acry Ester M", manufactured by Mitsubishi Rayon Co., Ltd.) and 5 parts of ethylene glycol dimethacrylate (trade name "Acry Ester ED", manufactured by Mitsubishi Rayon Co., Ltd.) was added 0.007 parts of 2,6-di-t-butyl-4-methylphenol (trade name: "Sumilizer BHT", manufactured by Sumitomo Chemical Co., Ltd.) as a polymerization inhibitor, and further, 35 parts of the acrylic polymer (P-2) obtained in Production example (2) was added, the resulted mixture was heated to 60° C. and stirred for 2 hours for dissolving (P-2) completely to obtain an acrylic syrup. This acrylic syrup had a viscosity at 20° C. of 900 mPa·s.

To 30 parts of the resulted syrup was added 0.5 parts of t-amyl peroxy benzoate (trade name: "KD-1", manufactured by Kayaku Akuzo K.K., 10 hours half life temperature=100° C.) as a curing agent, 0.15 parts of zinc stearate as an internal releasing agent, 60 parts of aluminum hydroxide (trade name: "Higilite H-310", manufactured by Showa Denko K.K.) as an inorganic filler, 0.05 parts of a white inorganic pigment or black inorganic pigment and 10 parts of the polymer powder (P-1) obtained in Production example (1) as a thickening agent, and the mixture was kneaded for 10 minutes by a kneader to obtain an acrylic BMC. The resulted acrylic BMC needed no aging, revealed no stickiness even directly after kneading and handling thereof was excellent.

Then, this acrylic BMC was filled in a mold for flat plate molding of 200 mm square and was cured with heating and pressing for 10 minutes under conditions of a upper mold temperature of 130° C., a lower mold temperature of 115° C. and a pressure of 10 MPa, to obtain white or black acrylic artificial marble having a thickness of 10 mm.

The resulted acrylic artificial marble was ground by a crusher to obtain a white or black inorganic filler-containing resin particle having an average particle size of 350 $\mu$m. The powdery properties thereof are shown in Table 2.

TABLE 2

| | Powdery property of inorganic filler-containing resin particle | | | | |
|---|---|---|---|---|---|
| | Average particle size ($\mu$m) | Bulk density (g/ml) | Oil absorption (ml/100 g) | Degree of swelling (-fold) | Specific surface area (m$^2$/g) |
| Inorganic filler-containing resin particle | 350 | 0.82 | 45 | 1.1 | 0.5 |

EXAMPLE I-1

15 parts of methyl methacrylate (trade name "Acry Ester M", manufactured by Mitsubishi Rayon Co., Ltd.) as an acrylic mono-functional monomer (a1), 9 parts of triethylene glycol dimethacrylate represented by the general formula (I) wherein $R_1$ represents a methyl group and k=3 (trade name: "NK Ester 3G", manufactured by Shinnakamura Kagaku Kogyo K.K.) as an acrylic poly-functional monomer (a2), 0.007 parts of 2,6-di-t-butyl-4-methylphenol (trade name: "Sumilizer BHT", manufactured by Sumitomo Chemical Co., Ltd.) as a polymerization inhibitor, 0.5 parts of t-amyl peroxy benzoate (trade name: "KD-1", manufactured by Kayaku Akuzo K.K., 10 hours half life temperature=100° C.) as a curing agent, 0.15 parts of zinc stearate as an internal releasing agent, 61 parts of aluminum hydroxide (trade name: "Higilite H-310", manufactured by Showa Denko K.K.) as an inorganic filler (B), and 15 parts of the polymer powder (P-1) as an acrylic polymer (b) (thickening agent) were charged into a kneader, and the mixture was kneaded for 10 minutes to obtain an acrylic BMC. The resulted acrylic BMC was thickened to be a dough-like material even directly after kneading, manifested no stickiness and handling thereof was excellent.

Then, this acrylic BMC was filled in a mold for flat plate molding of 200 mm square and was cured with heating and pressing for 10 minutes under conditions of a upper mold temperature of 130° C., a lower mold temperature of 115° C. and a pressure of 10 MPa, to obtain acrylic artificial marble having a thickness of 10 mm. Defect such as deformation and the like was not recognized in taking the resulted artificial marble out of a mold, and the artificial marble could be taken out without problem. The surface of the resulted artificial marble was in mirror-like condition having extremely high gloss and no deficiency at all.

This artificial marble had an Izod impact value of 12.0 kJ/m$^2$ and a falling ball impact height of 85 cm. A flat plate having a thickness of 3.2 mm was separately molded using this acrylic BMC by the same method, and deflection temperature under load was evaluated to find it was 103° C.

This acrylic BMC was left at 23° C., then, it was not cured even after 3 months and storage stability was excellent.

EXAMPLE I-2

An acrylic BMC and acrylic artificial marble were obtained in the same manners as in Example I-1 except that tetraethylene glycol dimethacrylate represented by the general formula (I) wherein $R_1$ represents a methyl group and k=4 (trade name: "NK Ester 4G", manufactured by Shinnakamura Kagaku Kogyo K.K.) was used instead of triethylene glycol dimethacrylate as an acrylic poly-functional monomer (a2). The evaluation results are shown in Table 4.

EXAMPLE I-3

An acrylic BMC and acrylic artificial marble were obtained in the same manners as in Example I-2 except that the amount of methyl methacrylate was changed to 16 parts, the amount of tetraethylene glycol dimethacrylate was changed to 5 parts, the amount of the polymer powder (P-1) was changed to 14 parts, and the weight of aluminum hydroxide was changed to 65 parts. The evaluation results are shown in Table 4.

EXAMPLE I-4

An acrylic BMC and acrylic artificial marble were obtained in the same manners as in Example I-1 except that 12 parts of methyl methacrylate and 3 parts of cyclohexyl methacrylate (trade name: "Acry Ester CH", manufactured by Mitsubishi Rayon CO., Ltd.) were used together instead of single use of 15 parts of methyl methacrylate as an acrylic mono-functional monomer (a1) and 0.5 parts of 1,1-bis(t-butyl peroxy)3,3,5-trimethylcyclohexane (trade name: "Perhexa 3M", manufactured by NOF Corp., 10 hours half life temperature=90° C.) was used as a curing agent (C). The evaluation results are shown in Table 4.

EXAMPLE I-5

15 parts of methyl methacrylate as an acrylic mono-functional monomer (a1), 9 parts of triethylene glycol dimethacrylate represented by the general formula (I) wherein $R_1$ represents a methyl group and k=3 as an acrylic poly-functional monomer (a2), 0.007 parts of 2,6-di-t-butyl-4-methylphenol as a polymerization inhibitor, 0.5 parts of t-amyl peroxy benzoate as a curing agent, 0.15 parts of zinc stearate as an internal releasing agent, 46 parts of aluminum hydroxide as an inorganic filler (B), 20 parts in total of the black inorganic filler-containing resin particle (10 parts) and the white inorganic filler-containing resin particle (10 parts) obtained in Production example (3) as an inorganic filler-containing resin particle (D), and 10 parts of the polymer powder (P-1) as an acrylic polymer (b) (thickening agent) were charged into a kneader, and the mixture was kneaded for 10 minutes to obtain an acrylic BMC. The resulted acrylic BMC was thickened to be a dough-like material even directly after kneading, manifested no stickiness and handling thereof was excellent. The results of the storage stability of this acrylic BMC are shown in Table 4.

Then, granite-like acrylic artificial marble was obtained in the same manner as in Example I-1 using this acrylic BMC. The evaluation results are shown in Table 4.

EXAMPLE I-6

An acrylic BMC and acrylic artificial marble were obtained in the same manners as in Example I-5 except that tetraethylene glycol dimethacrylate represented by the general formula (I) wherein $R_1$ represents a methyl group and k=4 was used instead of triethylene glycol dimethacrylate as an acrylic poly-functional monomer (a2). The evaluation results are shown in Table 4.

EXAMPLE I-7

An acrylic BMC and acrylic artificial marble were obtained in the same manners as in Example I-5 except that 12 parts of methyl methacrylate and 3 parts of cyclohexyl methacrylate were used as an acrylic mono-functional monomer (a1), and 0.5 parts of t-amyl peroxy 3,5,5-trimethylhexanoate (trade name: "Kaya Ester AN", manufactured by Kayaku Akuzo K.K., 10 hours half life temperature=95° C.) as a curing agent (C). The evaluation results are shown in Table 4.

EXAMPLE I-8

An acrylic BMC and acrylic artificial marble were obtained in the same manners as in Example I-5 except that 6 parts of methyl methacrylate and 1 part of isobornyl methacrylate (trade name: "Acry Ester IBX", manufactured by Mitsubishi Rayon Co., Ltd.) were used as an acrylic mono-functional monomer (a1), 3 parts of triethylene glycol dimethacrylate represented by the general formula (I) wherein $R_1$ represents a methyl group and k=3 and 12 parts of neopentyl glycol dimethacrylate (trade name: "NK Ester NPG", manufactured by Shinnakamura Kagaku Kogyo K.K.) were used together as an acrylic poly-functional monomer (a2), and 12 parts of the polymer powder (P-1) was used as an acrylic polymer (B) (thickening agent). The evaluation results are shown in Table 4.

Comparative Example 1

To 63 parts of methyl methacrylate as an acrylic mono-functional monomer (a1) was added 0.007 parts of 2,6-di-t-butyl-4-methylphenol as a polymerization initiator, and further 37 parts of the polymer powder (P-2) obtained in Production example (2) was added as an acrylic polymer (b), and the mixture was heated to 60° C. and stirred for 2 hours for dissolving the polymer powder (P-2) completely to obtain an acrylic syrup. This acrylic syrup had a viscosity at 20° C. of 1500 mPa·s.

To 4.6 parts of this acrylic syrup was added 8.4 parts of styrene (manufactured by Mitsubishi Chemical Co., Ltd.), and 7 parts of polyethylene glycol dimethacrylate represented by the general formula (I) wherein $R_1$ represents a methyl group and k=9 (trade name: "NK Ester 9G", manufactured by Shinnakamura Kagaku Kogyo K.K.) singly as an acrylic poly-functional monomer (a2), and further, 0.5 parts of benzoyl peroxide (trade name: "Kadox BCH50", manufactured by Kayaku Akuzo K.K., 10 hours half life temperature=72° C.) as a curing agent (C), 0.15 parts of zinc stearate as an internal releasing agent, 72 parts of aluminum hydroxide as an inorganic filler (B), and 8 parts of the polymer powder (P-1) as an acrylic polymer (b) (thickening agent) were charged into a kneader, and the mixture was kneaded for 10 minutes to obtain an acrylic BMC.

Then, this acrylic BMC was filled in a mold for flat plate molding of 200 mm square and was cured with heating and pressing the under conditions as in Example I-1. After curing, the resulted molded article was deformed and whitening occurred when the molded article was taken out from a mold. Further the resulted acrylic artificial marble showed no unevenness in gloss on the surface thereof, however, gloss was low overall. The deflection temperature under load of this acrylic artificial marble was evaluated to find it was as low as 67° C. Other physical properties are shown in Table 4.

This acrylic BMC was left at 23° C., then, it was cured in two weeks and the storage stability was poor.

Comparative Example 2

An acrylic BMC and granite-like acrylic artificial marble were obtained in the same manners as in Example I-5 except that ethylene glycol dimethacrylate represented by the general formula (I) wherein $R_1$ represents a methyl group and k=1 was used instead of triethylene glycol dimethacrylate as an acrylic poly-functional monomer (a2). The evaluation results are shown in Table 4.

The deflection temperature under load of this acrylic artificial marble was as high as 126° C., and though it was not deformed particularly in being taken out from a mold, the Izod impact value was 6.2 kJ/m², the falling ball impact height was 40 cm, namely the impact-resistance was low.

Comparative Example 3

An acrylic BMC and granite-like acrylic artificial marble were obtained in the same manners as in Example I-5 except that neopentyl glycol dimethacrylate was used instead of the compound represented by the general formula (I) as an acrylic poly-functional monomer (a2).

The deflection temperature under load of this acrylic artificial marble was as high as 126° C., and though it was not deformed particularly in being taken out from a mold, the Izod impact value was 6.4 kJ/m$^2$, the falling ball impact height was 45 cm, namely the impact-resistance was low.

EXAMPLE II-1

An acrylic BMC and acrylic artificial marble were obtained in the same manners as in Example I-1 except that 3 parts of poly-propylene glycol dimethacrylate represented by the general formula (II) wherein $R_1$ represents a methyl group and l+m=7 (trade name: "NK Ester 9PG", manufactured by Shinnakamura Kagaku Kogyo K.K.) and 7 parts of neopentyl glycol dimethacrylate were used together instead of 9 parts of triethylene glycol dimethacrylate as an acrylic poly-functional monomer (a2), t-amyl peroxy 3,5,5-trimethylhexanoate was used instead of t-amyl peroxy benzoate as a curing agent (C), and the amount of the polymer powder (P-1) was changed to 14 parts. The evaluation results are shown in Table 6.

EXAMPLE II-2

An acrylic BMC and granite-like acrylic artificial marble were obtained in the same manners as in Example I-5 except that the amount of methyl methacrylate was changed to 14 parts, and 3 parts of polypropylene glycol dimethacrylate represented by the general formula (II) wherein $R_1$ represents a methyl group and l+m=7 and 7 parts of neopentyl glycol dimethacrylate were used together instead of 9 parts of triethylene glycol dimethacrylate as an acrylic poly-functional monomer (a2). The evaluation results are shown in Table 6.

EXAMPLE II-3

An acrylic BMC and granite-like acrylic artificial marble were obtained in the same manners as in Example I-5 except that the amount of methyl methacrylate was changed to 7 parts, 3 parts of polypropylene glycol dimethacrylate represented by the general formula (II) wherein $R_1$ represents a methyl group and l+m=7 and 12 parts of neopentyl glycol dimethacrylate were used together instead of 9 parts of triethylene glycol dimethacrylate as an acrylic poly-functional monomer (a2), 1,1-bis(t-butyl peroxy) 3,3,5-trimethylcyclohexane was used instead of t-amyl peroxy benzoate as a curing agent (C) and the amount of the polymer powder (P-1) was changed to 12 parts. The evaluation results are shown in Table 6.

EXAMPLE II-4

An acrylic BMC and granite-like acrylic artificial marble were obtained in the same manners as in Example I-5 except that the amount of methyl. methacrylate was changed to 11 parts, 3 parts of polypropylene glycol dimethacrylate represented by the general formula (II) wherein $R_1$ represents a methyl group and l+m=7 and 10 parts of triethylene glycol dimethacrylate represented by the general formula (I) wherein $R_1$ represents a methyl group and k=3 were used together instead of single use of 9 parts of triethylene glycol dimethacrylate as an acrylic poly-functional monomer (a2), and 1,1-bis(t-butyl peroxy) 3,3,5-trimethylcyclohexane was used instead of t-amyl peroxy benzoate as a curing agent (C). The evaluation results are shown in Table 6.

EXAMPLE II-5

An acrylic BMC and granite-like acrylic artificial marble were obtained in the same manners as in Example I-5 except that 7 parts of methyl methacrylate and 3 parts of cyclohexyl methacrylate were used together instead of single use of 15 parts of methyl methacrylate as an acrylic mono-functional monomer (a1), 3 parts of polypropylene glycol dimethacrylate represented by the general formula (II) wherein $R_1$ represents a methyl group and l+m=7 and 9 parts of neopentyl glycol dimethacrylate were used together instead of 9 parts of triethylene glycol dimethacrylate as an acrylic poly-functional monomer (a2), 1,1-bis(t-butyl peroxy) 3,3,5-trimethylcyclohexane was used instead of t-amyl peroxy benzoate as a curing agent (C), and the amount of the polymer powder (P-1) was changed to 12 parts. The evaluation results are shown in Table 6.

Comparative Example 4

An acrylic BMC and granite-like acrylic artificial marble were obtained in the same manners as in Example II-2 except that 10 parts of neopentyl glycol dimethacrylate was used instead of 3 parts of polypropylene glycol dimethacrylate represented by the general formula (II) wherein $R_1$ represents a methyl group and l+m=7 and 7 parts of neopentyl glycol dimethacrylate.

The deflection temperature under load of this acrylic artificial marble was as high as 124° C., and though it was not deformed particularly in being taken out from a mold, the Izod impact value was 6.4 kJ/m$^2$, the falling ball impact height was 45 cm, namely the impact-resistance was low.

EXAMPLE III-1

An acrylic BMC and acrylic artificial marble were obtained in the same manners as in Example I-1 except that 3 parts of poly-butylene glycol dimethacrylate represented by the general formula (III) wherein $R_1$ represents a methyl group and n=8 to 9 (trade name: "Acryl Ester PBOM", manufactured by Mitsubishi Rayon Co., Ltd.) and 7 parts of neopentyl glycol dimethacrylate were used together instead of 9 parts of triethylene glycol dimethacrylate as an acrylic poly-functional monomer (a2), t-amyl peroxy 3,5,5-trimethylhexanoate was used instead of t-amyl peroxy benzoate as a curing agent (C), and the amount of the polymer powder (P-1) was changed to 14 parts. The evaluation results are shown in Table 8.

EXAMPLE III-2

An acrylic BMC and granite-like acrylic artificial marble were obtained in the same manners as in Example I-5 except that the amount of methyl methacrylate was changed to 14 parts, and 3 parts of polybutylene glycol dimethacrylate represented by the general formula (III) wherein $R_1$ represents a methyl group and n=8 to 9 and 7 parts of neopentyl glycol dimethacrylate were used together instead of 9 parts of triethylene glycol dimethacrylate as an acrylic poly-functional monomer (a2). The evaluation results are shown in Table 8.

EXAMPLE III-3

An acrylic BMC and granite-like acrylic artificial marble were obtained in the same manners as in Example I-5 except that the amount of methyl methacrylate was changed to 7 parts, 3 parts of polybutylene glycol dimethacrylate represented by the general formula (III) wherein $R_1$ represents a methyl group and n=8 to 9 and 12 parts of neopentyl glycol dimethacrylate were used together instead of 9 parts of triethylene glycol dimethacrylate as an acrylic poly-functional monomer (a2), 1,1-bis(t-butyl peroxy) 3,3,5-trimethylcyclohexane was used instead of t-amyl peroxy benzoate as a curing agent (C) and the amount of the polymer powder (P-1) was changed to 12 parts. The evaluation results are shown in Table 8.

EXAMPLE III-4

An acrylic BMC and granite-like acrylic artificial marble were obtained in the same manners as in Example I-5 except that the amount of methyl methacrylate was changed to 11 parts, 3 parts of polybutylene glycol dimethacrylate represented by the general formula (III) wherein $R_1$ represents a methyl group and n=8 to 9 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and 1,1-bis(t-butyl peroxy) 3,3,5-trimethylcyclohexane was used instead of t-amyl peroxy benzoate as a curing agent (C). The evaluation results are shown in Table 8.

EXAMPLE III-5

An acrylic BMC and granite-like acrylic artificial marble were obtained in the same manners as in Example I-5 except that 7 parts of methyl methacrylate and 3 parts of cyclohexyl methacrylate were used together instead of single use of 15 parts of methyl methacrylate as an acrylic mono-functional monomer (a1), 3 parts of polybutylene glycol dimethacrylate represented by the general formula (III) wherein Rl represents a methyl group and n=8 to 9 and 9 parts of neopentyl glycol dimethacrylate were used together instead of 9 parts of triethylene glycol dimethacrylate as an acrylic poly-functional monomer (a2), 1,1-bis(t-butyl peroxy) 3,3,5-trimethylcyclohexane was used instead of t-amyl peroxy benzoate as a curing agent (C), and the amount of the polymer powder (P-1) was changed to 12 parts. The evaluation results are shown in Table 8.

EXAMPLE III-6

An acrylic BMC and granite-like acrylic artificial marble were obtained in the same manners as in Example I-5 except that polybutylene glycol diacrylate represented by the general formula (III) wherein $R_1$ represents a hydrogen atom and n=3 (trade name: "Light Acrylate PTMGA-250", manufactured by Kyoueisha Kagaku K.K.) was used instead of triethylene glycol dimethacrylate as an acrylic poly-functional monomer (a2). The evaluation results are shown in Table 8.

EXAMPLE III-7

An acrylic BMC and granite-like acrylic artificial marble were obtained in the same manners as in Example I-5 except that the amount of methyl methacrylate was changed to 19 parts and 5 parts of polybutylene glycol diacrylate represented by the general formula (III) wherein $R_1$ represents a hydrogen atom and n=3 was used instead of 9 parts of triethylene glycol dimethacrylate as an acrylic poly-functional monomer (a2). The evaluation results are shown in Table 8.

Comparative Example 5

An acrylic BMC and granite-like acrylic artificial marble were obtained in the same manners as in Example III-2 except that 10 parts of 1,4-butylene glycol dimethacrylate represented by the general formula (III) wherein $R_1$ represents a methyl group and n=1 (trade name: "Light Acrylate 1·4BG", manufactured by Kyoueisha Kagaku K.K.) was used instead 3 parts of polybutylene glycol dimethacrylate represented by the general formula (III) wherein $R_1$ represents a methyl group and n=8 to 9 and 7 parts of neopentyl glycol dimethacrylate as an acrylic poly-functional monomer (a2).

The deflection temperature under load of this acrylic artificial marble was as high as 122° C., and though it was not deformed particularly in being taken out from a mold, the Izod impact value was 6.7 kJ/m², the falling ball impact height was 50 cm, namely the impact-resistance was low.

EXAMPLE IV-1

An acrylic BMC and acrylic artificial marble were obtained in the same manners as in Example I-1 except that 3 parts of polycaprolactone diol diacrylate represented by the general formula (IV) wherein $R_1$ represents a hydrogen atom, $R_2$ and $R_4$ represent a pentylene group, $R_3$ represents a dimethylethylene group, $R_5$ represents a dimethylpropylene group and p+r=4 and q=1 (trade name: "Kayarad HX-620", manufactured by Nippon Kayaku K.K.) and 7 parts of neopentyl glycol dimethacrylate were used together instead of 9 parts of triethylene glycol dimethacrylate as an acrylic poly-functional monomer (a2), t-amyl peroxy 3,5,5-trimethylhexanoate was used instead of t-amyl peroxy benzoate as a curing agent (C), and the amount of the polymer powder (P-1) was changed to 14 parts. The evaluation results are shown in Table 10.

EXAMPLE IV-2

An acrylic BMC and granite-like acrylic artificial marble were obtained in the same manners as in Example I-5 except that the amount of methyl methacrylate was changed to 14 parts and 3 parts of polycaprolactone diol diacrylate represented by the general formula (IV) wherein $R_1$ represents a hydrogen atom, $R_2$ and $R_4$ represent a pentylene group, $R_3$ represents a dimethylethylene group, $R_5$ represents a dimethylpropylene group and p+r=4 and q=1 and 7 parts of neopentyl glycol dimethacrylate were used together instead of 9 parts of triethylene glycol dimethacrylate as an acrylic poly-functional monomer (a2). The evaluation results are shown in Table 10.

EXAMPLE IV-3

An acrylic BMC and granite-like acrylic artificial marble were obtained in the same manners as in Example I-5 except that the amount of methyl methacrylate was changed to 21 parts and 3 parts of polycaprolactone diol diacrylate represented by the general formula (IV) wherein $R_1$ represents a hydrogen atom, $R_2$ and $R_4$ represent a pentylene group, $R_3$ represents a dimethylethylene group, $R_5$ represents a dimethylpropylene group and p+r=2 and q=1 (trade name: "Kayarad HX-220", manufactured by Nippon Kayaku K.K.) was used instead of 9 parts of triethylene glycol dimethacrylate as an acrylic poly-functional monomer (a2). The evaluation results are shown in Table 10.

EXAMPLE IV-4

An acrylic BMC and granite-like acrylic artificial marble were obtained in the same manners as in Example I-5 except that the amount of methyl methacrylate was changed to 19 parts and 5 parts of polycaprolactone diol diacrylate represented by the general formula (IV) wherein $R_1$ represents a hydrogen atom, $R_2$ and $R_4$ represent a pentylene group, $R_3$ represents a dimethylethylene group, $R_5$ represents a dimethylpropylene group and p+r=2 and q=1 was used instead of 9 parts of triethylene glycol dimethacrylate as an acrylic poly-functional monomer (a2). The evaluation results are shown in Table 10.

Comparative Example 6

An acrylic BMC and granite-like acrylic artificial marble were obtained in the same manners as in Example IV-2 except that 10 parts of caprolactone diol diacrylate represented by the general formula (IV) wherein $R_1$ represents a hydrogen atom, $R_2$ represents a dimethylethylene group, $R_5$ represents a dimethylpropylene group and p=1 and q=r=0 (trade name: "Kayarad MANDA", manufactured by Nippon Kayaku K.K.) was used instead of 3 parts of polycaprolactone diol diacrylate represented by the general formula (IV) wherein $R_1$ represents a hydrogen atom, $R_2$ and $R_4$ represent a pentylene group, $R_3$ represents a dimethylethylene group, $R_5$ represents a dimethylpropylene group and p+r=4 and q=1 and 7 parts of neopentyl glycol dimethacrylate as an acrylic poly-functional monomer (a2).

The deflection temperature under load of this acrylic artificial marble was as high as 95° C., and though it was not deformed particularly in being taken out from a mold, the Izod impact value was 8.4 kJ/m$^2$, the falling ball impact height was 60 cm, namely the impact-resistance was low.

EXAMPLE V-1

An acrylic BMC and acrylic artificial marble were obtained in the same manners as in Example I-1 except that the amount of methyl methacrylate was changed to 14 parts, and 3 parts of polyethylene glycol dimethacrylate represented by the general formula (I) wherein $R_1$ represents a methyl group and k=14 (trade name: "NK Ester 14G", manufactured by Shinnakamura Kagaku Kogyo K.K.) and 7 parts of neopentyl glycol dimethacrylate were used together instead of 9 parts of triethylene glycol dimethacrylate as an acrylic poly-functional monomer (a2). The evaluation results are shown in Table 12.

EXAMPLE V-2

An acrylic BMC and acrylic artificial marble were obtained in the same manners as in Example I-1 except that the amount of methyl methacrylate was changed to 11 parts, and 3 parts of polyethylene glycol dimethacrylate represented by the general formula (I) wherein $R_1$ represents a methyl group and k=14 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and t-amyl peroxy 3,5,5-trimethylhexanoate was used instead of t-amyl peroxy benzoate as a curing agent (C). The evaluation results are shown in Table 12.

EXAMPLE V-3

An acrylic BMC and acrylic artificial marble were obtained in the same manners as in Example I-1 except that the amount of methyl methacrylate was changed to 14 parts, and 3 parts of polyethylene glycol dimethacrylate represented by the general formula (I) wherein $R_1$ represents a methyl group and k=23 (trade name: "NK Ester 23G", manufactured by Shinnakamura Kagaku Kogyo K.K.) and 7 parts of neopentyl glycol dimethacrylate were used together instead of 9 parts of triethylene glycol dimethacrylate as an acrylic poly-functional monomer (a2). The evaluation results are shown in Table 12.

EXAMPLE V-4

An acrylic BMC and acrylic artificial marble were obtained in the same manners as in Example I-1 except that the amount of methyl methacrylate was changed to 11 parts, 3 parts of polyethylene glycol dimethacrylate represented by the general formula (I) wherein $R_1$ represents a methyl group and k=23 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and t-amyl peroxy 3,5,5-trimethylhexanoate was used instead of t-amyl peroxy benzoate as a curing agent (C). The evaluation results are shown in Table 12.

EXAMPLE V-5

An acrylic BMC and acrylic artificial marble were obtained in the same manners as in Example I-1 except that 8 parts of methyl methacrylate and 3 parts of cyclohexyl methacrylate were used together instead of single use of 15 parts of methyl methacrylate as an acrylic mono-functional monomer (a1), 3 parts of polyethylene glycol dimethacrylate represented by the general formula (I) wherein $R_1$ represents a methyl group and k=23 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and 1,1-bis(t-butyl peroxy) 3,3,5-trimethylcyclohexane was used instead of t-amyl peroxy benzoate as a curing agent (C). The evaluation results are shown in Table 12.

EXAMPLE V-6

An acrylic BMC and granite-like acrylic artificial marble were obtained in the same manners as in Example I-5 except that the amount of methyl methacrylate was changed to 14 parts, and 3 parts of polyethylene glycol dimethacrylate represented by the general formula (I) wherein $R_1$ represents a methyl group and k=14 and 7 parts of neopentyl glycol dimethacrylate were used together instead of 9 parts of triethylene glycol dimethacrylate as an acrylic poly-functional monomer (a2). The evaluation results are shown in Table 12.

EXAMPLE V-7

An acrylic BMC and granite-like acrylic artificial marble were obtained in the same manners as in Example I-5 except that the amount of methyl methacrylate was changed to 11 parts, 3 parts of polyethylene glycol dimethacrylate represented by the general formula (I) wherein $R_1$ represents a methyl group and k=14 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and t-amyl peroxy 3,5,5-trimethylhexanoate was used instead of t-amyl peroxy benzoate as a curing agent (C). The evaluation results are shown in Table 12.

EXAMPLE V-8

An acrylic BMC and granite-like acrylic artificial marble were obtained in the same manners as in Example I-5 except that the amount of methyl methacrylate was changed to 14 parts, and 3 parts of polyethylene glycol dimethacrylate represented by the general formula (I) wherein $R_1$ represents a methyl group and k=23 and 7 parts of neopentyl glycol dimethacrylate were used together instead of 9 parts of triethylene glycol dimethacrylate as an acrylic poly-functional monomer (a2). The evaluation results are shown in Table 12.

EXAMPLE V-9

An acrylic BMC and granite-like acrylic artificial marble were obtained in the same manners as in Example I-5 except that the amount of methyl methacrylate was changed to 11 parts, 3 parts of polyethylene glycol dimethacrylate represented by the general formula (I) wherein $R_1$ represents a methyl group and k=23 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and t-amyl peroxy 3,5,5-trimethylhexanoate was used instead of t-amyl peroxy benzoate as a curing agent (C). The evaluation results are shown in Table 12.

EXAMPLE V-10

An acrylic BMC and granite-like acrylic artificial marble were obtained in the same manners as in Example I-5 except that 8 parts of methyl methacrylate and 3 parts of cyclohexyl methacrylate were used together instead of single use of 15 parts of methyl methacrylate as an acrylic mono-functional monomer (a1), 3 parts of polyethylene glycol dimethacrylate represented by the general formula (I) wherein $R_1$ represents a methyl group and k=23 and 10 parts of triethylene glycol dimethacrylate represented by the general formula (I) wherein $R_1$ represents a methyl group and k=3 were used together instead of 9 parts of triethylene glycol dimethacrylate as an acrylic poly-functional monomer (a2), and 1,1-bis(t-butyl peroxy) 3,3,5-trimethylcyclohexane was used instead of t-amyl peroxy benzoate as a curing agent (C). The evaluation results are shown in Table 12.

Comparative Example 7

An acrylic BMC was obtained in the same manners as in Example I-5 except that polyethylene glycol dimethacrylate represented by the general formula (I) wherein $R_1$ represents a methyl group and k=23 was singly used instead of triethylene glycol dimethacrylate as an acrylic poly-functional monomer (a2).

Then, this acrylic BMC was filled in a mold for flat plate molding of 200 mm square and was cured with heating and pressing under the conditions as in Example I-1. After curing, the resulted molded article was deformed and whitening occurred when the molded article was taken out from a mold. Further the resulted acrylic artificial marble showed no unevenness in gloss on the surface thereof, however, gloss was low overall. The deflection temperature under load of this acrylic artificial marble was evaluated to find it was as low as 60° C. Other physical properties are shown in Table 12.

TABLE 3

| | Component (A) | | | | | | | | | Component (b) | | Component | Component | Component (C) | | Internal releasing |
|---|---|---|---|---|---|---|---|---|---|---|---|---|---|---|---|---|
| | Component (a1) | | | | Component (a2) | | | | | | | | | | | |
| | MMA | CHMA | IBXMA | ST | 3G | 4G | 9G | EDMA | NPG | P-1 | P-2 | (B) | (D) | Kind | Amount | agent |
| Ex. I-1 | 15 | — | — | — | 9 | — | — | — | — | 15 | — | 61 | — | KD-1 | 0.5 | 0.15 |
| Ex. I-2 | 15 | — | — | — | — | 9 | — | — | — | 15 | — | 61 | — | KD-1 | 0.5 | 0.15 |
| Ex. I-3 | 16 | — | — | — | — | 5 | — | — | — | 14 | — | 65 | — | KD-1 | 0.5 | 0.15 |
| Ex. I-4 | 12 | 3 | — | — | 9 | — | — | — | — | 15 | — | 61 | — | 3M | 0.5 | 0.15 |
| Ex. I-5 | 15 | — | — | — | 9 | — | — | — | — | 10 | — | 46 | 20 | KD-1 | 0.5 | 0.15 |
| Ex. I-6 | 15 | — | — | — | — | 9 | — | — | — | 10 | — | 46 | 20 | KD-1 | 0.5 | 0.15 |
| Ex. I-7 | 12 | 3 | — | — | 9 | — | — | — | — | 10 | — | 46 | 20 | AN | 0.5 | 0.15 |
| Ex. I-8 | 6 | — | 1 | — | 3 | — | — | — | 12 | 12 | — | 46 | 20 | KD-1 | 0.5 | 0.15 |
| Comp Ex. 1 | 2.9 | — | — | 8.4 | — | — | 7 | — | — | 8 | 1.7 | 72 | — | BPO | 0.5 | 0.15 |
| Comp Ex. 2 | 15 | — | — | — | — | — | — | 9 | — | 10 | — | 46 | 20 | KD-1 | 0.5 | 0.15 |
| Comp. Ex. 3 | 15 | — | — | — | — | — | — | — | 9 | 10 | — | 46 | 20 | KD-1 | 0.5 | 0.15 |

Abbreviations in Table 3 are shown below.

MMA: methyl methacrylate, CHMA: cyclohexyl methacrylate, IBXMA: isobornyl methacrylate, ST: styrene, 3G: triethylene glycol dimethacrylate, 4G: tetraethylene glycol dimethacrylate, 9G: polyethylene glycol (k = 9) dimethacrylate, EDMA: ethylene glycol dimethacrylate, NPG: neopentyl glycol dimethacrylate, KD-1: t-amyl peroxy benzoate, 3M: 1,1-bis(di-t-butyl peroxy) 3,3,5-trimethylcyclohexane, AN: t-amyl peroxy-3,5,5-trimethylhexanoate, BPO: benzoyl peroxide

TABLE 4

| | Property of BMC | | | | | | Falling | |
| --- | --- | --- | --- | --- | --- | --- | --- | --- |
| | Thickening property | Storage stability | Releasing property | Gloss | Unevenness in gloss | Deflection temperature under load (°C.) | Izod impact value (kJ/m$^2$) | ball impact height (cm) | Hot water resistance |
| Ex. I-1 | ○ | ○ | ○ | ◉ | ○ | 103 | 12.0 | 85 | ○+ |
| Ex. I-2 | ○ | ○ | ○ | ◉ | ○ | 94 | 13.8 | 90 | ○+ |
| Ex. I-3 | ○ | ○ | ○ | ○ | ○ | 110 | 12.3 | 85 | ○+ |
| Ex. I-4 | ○ | ○ | ○ | ◉ | ◉ | 112 | 11.1 | 80 | ○+ |
| Ex. I-5 | ○ | ○ | ○ | ◉ | ○ | 103 | 10.1 | 80 | ○+ |
| Ex. I-6 | ○ | ○ | ○ | ◉ | ○ | 94 | 12.0 | 85 | ○+ |
| Ex. I-7 | ○ | ○ | ○ | ◉ | ◉ | 103 | 10.1 | 75 | ○+ |
| Ex. I-8 | ○ | ○ | ○ | ◉ | ◉ | 121 | 11.2 | 80 | ◉ |
| Comp. Ex. 1 | ○ | X | X | X | ○ | 67 | 13.8 | 90 | X |
| Comp. Ex. 2 | ○ | ○ | ○ | ◉ | ○ | 126 | 6.2 | 40 | ◉ |
| Comp. Ex. 3 | ○ | ○ | ○ | ◉ | ○ | 122 | 6.4 | 45 | ◉ |

TABLE 5

| | Component (A) | | | | | | | | | Component (b) | | Component (B) | Component (D) | Component (C) | | Internal releasing agent |
| --- | --- | --- | --- | --- | --- | --- | --- | --- | --- | --- | --- | --- | --- | --- | --- | --- |
| | Component (a1) | | | Component (a2) | | | | | | | | | | | | |
| | MMA | CHMA | ST | 9PG | 3G | 9G | NPG | P-1 | P-2 | | | | | Kind | Amount | |
| Ex. II-1 | 15 | — | — | 3 | — | — | 7 | 14 | — | | | 61 | — | AN | 0.5 | 0.15 |
| Ex. II-2 | 14 | — | — | 3 | — | — | 7 | 10 | — | | | 46 | 20 | KD-1 | 0.5 | 0.15 |
| Ex. II-3 | 7 | — | — | 3 | — | — | 12 | 12 | — | | | 46 | 20 | 3M | 0.5 | 0.15 |
| Ex. II-4 | 11 | — | — | 3 | 10 | — | — | 10 | — | | | 46 | 20 | 3M | 0.5 | 0.15 |
| Ex. II-5 | 7 | 3 | — | 3 | — | — | 9 | 12 | — | | | 46 | 20 | 3M | 0.5 | 0.15 |
| Comp. Ex. 4 | 14 | — | — | — | — | — | 10 | 10 | — | | | 46 | 20 | KD-1 | 0.5 | 0.15 |

Abbreviations in Table 5 are shown below.
MMA: methyl methacrylate, CHMA: cyclohexyl methacrylate, ST: styrene, 9PG: polypropylene glycol (l + m = 7) dimethacrylate, 3G: triethylene glycol dimethacrylate, 9G: polyethylene glycol (k = 9) dimethacrylate, NPG: neopentyl glycol dimethacrylate, KD-1: t-amyl peroxy benzoate, 3M: 1,1-bis(di-t-butyl peroxy) 3,3,5-trimethylcyclohexane, AN: t-amyl peroxy-3,5,5-trimethylhexanoate

TABLE 6

| | Property of BMC | | | | | | Falling | |
| --- | --- | --- | --- | --- | --- | --- | --- | --- |
| | Thickening property | Storage stability | Releasing property | Gloss | Unevenness in gloss | Deflection temperature under load (°C.) | Izod impact value (kJ/m$^2$) | ball impact height (cm) | Hot water resistance |
| Ex. II-1 | ○ | ○ | ○ | ◉ | ○ | 103 | 10.1 | 80 | ◉ |
| Ex. II-2 | ○ | ○ | ○ | ◉ | ○ | 101 | 10.3 | 80 | ◉ |
| Ex. II-3 | ○ | ○ | ○ | ◉ | ○+ | 114 | 9.9 | 75 | ◉ |
| Ex. II-4 | ○ | ○ | ○ | ◉ | ○ | 94 | 12.0 | 85 | ◉ |
| Ex. II-5 | ○ | ○ | ○ | ◉ | ◉ | 101 | 10.9 | 80 | ◉ |
| Comp. Ex.4 | ○ | ○ | ○ | ◉ | ○ | 124 | 6.4 | 45 | ◉ |

TABLE 7

| | Component (A) | | | | | | | | Component (b) | Component (B) | Component (D) | Component (C) | | Internal releasing agent |
|---|---|---|---|---|---|---|---|---|---|---|---|---|---|---|
| | Component (a1) | | Component (a2) | | | | | | | | | | | |
| | MMA | CHMA | PBOM | PTMGA | 3G | 9G | BDMA | NPG | P-1 | | | Kind | Amount | |
| Ex. III-1 | 15 | — | 3 | — | — | — | — | 7 | 14 | 61 | — | AN | 0.5 | 0.15 |
| Ex. III-2 | 14 | — | 3 | — | — | — | — | 7 | 10 | 46 | 20 | KD-1 | 0.5 | 0.15 |
| Ex. III-3 | 7 | — | 3 | — | — | — | — | 12 | 12 | 46 | 20 | 3M | 0.5 | 0.15 |
| Ex. III-4 | 11 | — | 3 | — | 10 | — | — | — | 10 | 46 | 20 | 3M | 0.5 | 0.15 |
| Ex. III-5 | 7 | 3 | 3 | — | — | — | — | 9 | 12 | 46 | 20 | 3M | 0.5 | 0.15 |
| Ex. III-6 | 15 | — | — | 9 | — | — | — | — | 10 | 46 | 20 | KD-1 | 0.5 | 0.15 |
| Ex. III-7 | 19 | — | — | 5 | — | — | — | — | 10 | 46 | 20 | KD-1 | 0.5 | 0.15 |
| Comp. Ex. 5 | 14 | — | — | — | — | — | 10 | — | 10 | 46 | 20 | KD-1 | 0.5 | 0.15 |

Abbreviations in Table 7 are shown below.

MMA: methyl methacrylate, CHMA: cyclohexyl methacrylate, PBOM: polybutylene glycol (n = 8 to 9) dimethacrylate, PTMGA: polybutylene glycol (n = 3) diacrylate, 3G: triethylene glycol dimethacrylate, 9G: polyethylene glycol (k = 9) dimethacrylate, BDMA: 1,4-butylene glycol dimethacrylate, NPG: neopentyl glycol dimethacrylate, KD-1: t-amyl peroxy benzoate, 3M: 1,1-bis(di-t-butyl peroxy) 3,3,5-trimethylcyclohexane, AN: t-amyl peroxy-3,5,5-trimethylhexanoate

TABLE 8

| | Property of BMC | | | | | Physical property of artificial marble molded article | | | |
|---|---|---|---|---|---|---|---|---|---|
| | Thickening property | Storage stability | Releasing property | Gloss | Unevenness in gloss | Deflection temperature under load (° C.) | Izod impact value (kJ/m$^2$) | Falling ball impact height (cm) | Hot water resistance |
| Ex. III-1 | ○ | ○ | ○ | ◎ | ○ | 105 | 11.0 | 80 | ◎ |
| Ex. III-2 | ○ | ○ | ○ | ◎ | ○ | 103 | 12.3 | 95 | ◎ |
| Ex. III-3 | ○ | ○ | ○ | ◎ | ○+ | 116 | 11.9 | 90 | ◎ |
| Ex. III-4 | ○ | ○ | ○ | ◎ | ○ | 97 | 14.1 | 120 | ◎ |
| Ex. III-5 | ○ | ○ | ○ | ◎ | ◎ | 103 | 12.9 | 95 | ◎ |
| Ex. III-6 | ○ | ○ | ○ | ◎ | ○ | 80 | 15.0 | 130 | ○+ |
| Ex. III-7 | ○ | ○ | ○ | ○ | ○ | 83 | 16.0 | 135 | ○+ |
| Comp. Ex. 5 | ○ | ○ | ○ | ◎ | ○ | 122 | 6.7 | 50 | ◎ |

TABLE 9

| | Component (A) | | | | | | | Component (b) | | Component (B) | Component (D) | Component (C) | | Internal releasing agent |
|---|---|---|---|---|---|---|---|---|---|---|---|---|---|---|---|
| | Component (a1) | | Component (a2) | | | | | | | | | | | | |
| | MMA | ST | HX620 | HX220 | 9G | MANDA | NPG | P-1 | P-1 | | | Kind | Amount | |
| Ex. IV-1 | 15 | — | 3 | — | — | — | 7 | 14 | — | 61 | — | AN | 0.5 | 0.15 |
| Ex. IV-2 | 14 | — | 3 | — | — | — | 7 | 10 | — | 46 | 20 | KD-1 | 0.5 | 0.15 |
| Ex. IV-3 | 21 | — | — | 3 | — | — | — | 10 | — | 46 | 20 | KD-1 | 0.5 | 0.15 |
| Ex. IV-4 | 19 | — | — | 5 | — | — | — | 10 | — | 46 | 20 | KD-1 | 0.5 | 0.15 |
| Comp. Ex. 6 | 14 | — | — | — | — | 10 | — | 10 | — | 46 | 20 | KD-1 | 0.5 | 0.15 |

Abbreviations in Table 9 are shown below.
MMA: methyl methacrylate, ST: styrene, HX620: Kayarad HX-620, HX220: Kayarad HX-220, 9G: polyethylene glycol (k = 9) dimethacrylate, MANDA: Kayarad MANDA, NPG: neopentyl glycol dimethacrylate, KD-1: t-amyl peroxy benzoate, AN: t-amyl peroxy-3,5,5-trimethylhexanoate

TABLE 10

Physical property of artificial marble molded article

| | Property of BMC | | | | | | | | |
|---|---|---|---|---|---|---|---|---|---|
| | Thickening property | Storage stability | Releasing property | Gloss | Unevenness in gloss | Deflection temperature under load (° C.) | Izod impact value (kJ/m$^2$) | Falling ball impact height (cm) | Hot water resistance |
| Ex. IV-1 | ○ | ○ | ○ | ⊚ | ○ | 109 | 11.0 | 80 | ⊚ |
| Ex. IV-2 | ○ | ○ | ○ | ⊚ | ○ | 107 | 11.0 | 80 | |
| Ex. IV-3 | ○ | ○ | ○ | ○ | ○ | 86 | 16.6 | 130 | |
| Ex. IV-4 | ○ | ○ | ○ | ○ | ○ | 82 | 16.4 | 130 | |
| Comp. Ex. 6 | ○ | ○ | ○ | ○ | ○ | 122 | 6.7 | 50 | |

TABLE 11

| | Component (A) | | | | | | | | | Component (b) | | Component (B) | Component (D) | Component (C) | | Internal releasing agent |
|---|---|---|---|---|---|---|---|---|---|---|---|---|---|---|---|---|
| | Component (a1) | | | Component (a2) | | | | | | | | | | | | |
| | MMA | CHMA | ST | 9G | 14G | 23G | NPG | 3G | P-1 | P-1 | | | | Kind | Amount | |
| Ex. V-1 | 14 | — | — | — | 3 | — | 7 | — | 15 | — | 61 | — | AN | 0.5 | 0.15 |
| Ex. V-2 | 11 | — | — | — | 3 | — | — | 10 | 15 | — | 61 | — | AN | 0.5 | 0.15 |
| Ex. V-3 | 14 | — | — | — | — | 3 | 7 | — | 15 | — | 61 | — | KD-1 | 0.5 | 0.15 |
| Ex. V-4 | 11 | — | — | — | — | 3 | — | 10 | 15 | — | 61 | — | AN | 0.5 | 0.15 |
| Ex. V-5 | 8 | 3 | — | — | — | 3 | — | 10 | 15 | — | 61 | — | 3M | 0.5 | 0.15 |
| Ex. V-6 | 14 | — | — | — | 3 | — | 7 | — | 10 | — | 46 | 20 | KD-1 | 0.5 | 0.15 |
| Ex. V-7 | 11 | — | — | — | 3 | — | — | 10 | 10 | — | 46 | 20 | AN | 0.5 | 0.15 |
| Ex. V-8 | 14 | — | — | — | — | 3 | 7 | — | 10 | — | 46 | 20 | KD-1 | 0.5 | 0.15 |
| Ex. V-9 | 11 | — | — | — | — | 3 | — | 10 | 10 | — | 46 | 20 | AN | 0.5 | 0.15 |
| Ex. V-10 | 8 | 3 | — | — | — | 3 | — | 10 | 10 | — | 46 | 20 | 3M | 0.5 | 0.15 |
| Comp. Ex. 7 | 15 | — | — | — | — | 9 | — | — | 10 | — | 46 | 20 | KD-1 | 0.5 | 0.15 |

Abbreviations in Table 11 are shown below.
MMA: methyl methacrylate, CHMA: cyclohexyl methacrylate, ST: styrene, 3G: triethylene glycoldimethacrylate, NPG: neopentyl glycol dimethacrylate, 9G: polyethylene glycol (k = 9) dimethacrylate, 14G: polyethylene glycol (k = 14) dimethacrylate, 23G: polyethylene glycol (k = 23) dimethacrylate, KD-1: t-amyl peroxy benzoate, 3M: 1,1-bis(di-t-butyl peroxy) 3,3,5-trimethylcyclohexane, AN: t-amyl peroxy-3,5,5-trimethylhexanoate

TABLE 12

Physical property of artificial marble molded article

| | Property of BMC | | | | | | | | |
|---|---|---|---|---|---|---|---|---|---|
| | Thickening property | Storage stability | Releasing property | Gloss | Unevenness in gloss | Deflection temperature under load (° C.) | Izod impact value (kJ/m$^2$) | Falling ball impact height (cm) | Hot water resistance |
| Ex. V-1 | ○ | ○ | ○ | ⊚ | ○ | 105 | 10.2 | 80 | ○ |
| Ex. V-2 | ○ | ○ | ○ | ⊚ | ○+ | 97 | 12.3 | 110 | ○ |
| Ex. V-3 | ○ | ○ | ○ | ⊚ | ○ | 104 | 11.1 | 95 | ○ |
| Ex. V-4 | ○ | ○ | ○ | ⊚ | ○+ | 94 | 13.6 | 110 | ○ |
| Ex. V-5 | ○ | ○ | ○ | ⊚ | ⊚ | 94 | 13.6 | 110 | ○ |
| Ex. V-6 | ○ | ○ | ○ | ⊚ | ○ | 105 | 10.1 | 80 | ○ |
| Ex. V-7 | ○ | ○ | ○ | ⊚ | ○+ | 97 | 12.5 | 100 | ○ |
| Ex. V-8 | ○ | ○ | ○ | ⊚ | ○ | 104 | 11.2 | 95 | ○ |
| Ex. V-9 | ○ | ○ | ○ | ⊚ | ○+ | 94 | 13.8 | 110 | ○ |
| Ex. V-10 | ○ | ○ | ○ | ⊚ | ⊚ | 94 | 13.8 | 110 | ○ |
| Comp. Ex. 7 | ○ | ○ | X | X | ○ | 60 | 20.6 | 125 | XX |

As also evident from the above-described examples, it is possible to obtain an acrylic premix which provides an acrylic SMC or BMC which is suitable for molding at high temperature, excellent in molding processability, has excellent thickening property and has excellent storage stability by compounding an acrylic poly-functional monomer having specific structure in the present invention, and further, acrylic artificial marble produced using this has excellent appearance and high impact-resistance, therefore is industrially very useful.

What is claimed is:

1. An acrylic premix comprising
   10 to 90% by weight of an acrylic resin composition (A) comprising an acrylic mono-functional monomer (a1), an acrylic poly-functional monomer (a2) containing at least one compound represented by any of the following general formulae (I) to (IV), and an acrylic polymer (b);
   10 to 90% by weight of an inorganic filler (B); and
   0.01 to 10 parts by weight of a curing agent (C) based on 100 parts by weight of the total amount of the acrylic resin composition (A) and the inorganic filler (B);

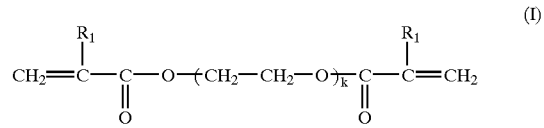

(in the formula (I), $R_1$ represents a hydrogen atom or a methyl group, and k represents an integer from 3 to 30.),

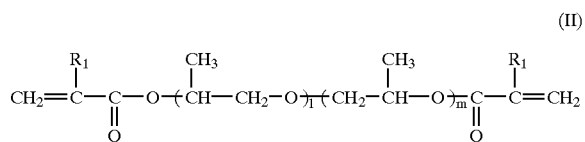

(in the formula (II), $R_1$ represents a hydrogen atom or a methyl group, and each of l and m represents an integer from 0 to 25 and l+m is 2 to 25.),

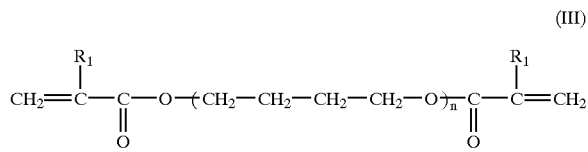

(in the formula (III), $R_1$ represents a hydrogen atom or a methyl group, and n represents an integer from 2 to 25.),

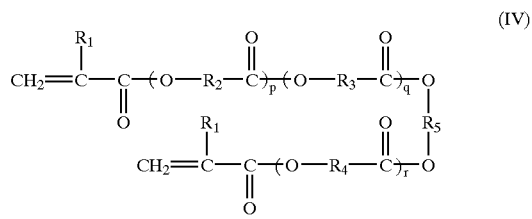

(in the formula (IV), $R_1$ represents a hydrogen atom or a methyl group, $R_2$ to $R_5$ represent an alkylene group having 1 to 10 carbon atoms, and each of p, q and r represents an integer from 0 to 10 and p+q+r is 2 to 25).

2. The acrylic premix according to claim 1, wherein a compound represented by the general formula (I) in which k=5 to 30 and at least one compound selected from the group consisting of ethylene glycol di(meth)acrylate, diethylene glycol di(meth)acrylate, triethylene glycol di(meth)acrylate, tetraethylene glycol di(meth)acrylate, 1,3-butylene glycol di(meth)acrylate, 1,4-butylene glycol di(meth)acrylate, neopentyl glycol di(meth)acrylate and trimethylolpropane tri(meth)acrylate are used together as the acrylic poly-functional monomer (a2).

3. The acrylic premix according to claim 1, wherein the curing agent (C) contains a radical polymerization initiator having a 10 hours half life temperature of 75° C. or more.

4. The acrylic premix according to claim 1, further comprising an inorganic filler-containing resin particle (D).

5. The acrylic premix according to claim 1, which is an acrylic SMC or BMC.

6. The acrylic premix according to claim 5, wherein the acrylic polymer (b) contains a polymer powder having a bulk density in the range from 0.1 to 0.7 g/ml and an oil absorption of linseed oil in the range from 60 to 200 ml/100 g.

7. An acrylic artificial marble obtained by curing the acrylic premix of claim 1.

8. The acrylic artificial marble according to claim 7, wherein the Izod impact value is 8.0 kJ/m² or more.

9. The acrylic artificial marble according to claim 7, wherein the deflection temperature under load is 70° C. or more.

10. A method for producing arylic artificial marble comprising curing the acrylic premix of claim 1 with pressing and heating at a temperature from 90° C. to 150° C.

11. The acrylic premix according to claim 1, wherein the acrylic resin composition (A) is present in an amount of 20 to 80% by weight based on the total acrylic premix weight.

12. The acrylic premix according to claim 1, wherein the acrylic polymer (b) is present in an amount of 0.1 to 30% by weight based on the total acrylic premix weight.

13. The acrylic premix according to claim 1, wherein said inorganic filler (B) comprises aluminum hydroxide, calcium carbonate, silica, or glass powder.

14. The acrylic premix according to claim 1, wherein said curing agent (C) is present in an amount of from 0.01 to 10 parts by weight based on 100 parts by weight of the total amount of the acrylic resin composition (A) and the inorganic filler (B).

15. The acrylic premix according to claim 4, wherein said inorganic filler-containing resin particle comprises cross-linked acrylic resin, cross-linked polyester resin or cross-linked styrene resin.

16. The acrylic premix according to claim 15, wherein said inorganic filler-containing resin particle comprises cross-linked acrylic resin.

17. The acrylic premix according to claim 4, wherein said inorganic filler-containing resin particle comprises two or more categories of particles, each having a different size or color or both than the other.

18. The acrylic artificial marble according to claim 8, wherein the Izod impact value is at least 10.0 kJ/m².

19. The acrylic artificial marble according to claim 18, wherein the Izod impact value is from 10.1 to 16.6 kJ/m².

20. The method according to claim 10, wherein the temperature of said heating is from 105° C. to 140° C.

21. The method according to claim 10, wherein the pressing is effected in the range of from 2 to 15 MPa.

22. The acrylic premix according to claim 1, which comprises at least one acrylic poly-functional monomer (a2) of the formula (I).

23. The acrylic premix according to claim 1, which comprises at least one acrylic poly-functional monomer (a2) of the formula (II).

24. The acrylic premix according to claim 1, which comprises at least one acrylic poly-functional monomer (a2) of the formula (III).

25. The acrylic premix according to claim 1, which comprises at least one acrylic poly-functional monomer (a2) of the formula (IV).

26. The acrylic premix according to claim 1, wherein said acrylic poly-functional monomer (a2) comprising at least one compound of the formulae (I) to (IV) is present in an amount of from 0.1 to 30% by weight based on a total amount of the acrylic premix.

27. The acrylic premix according to claim 26, wherein said acrylic poly-functional monomer (a2) is present in an amount of from 0.5 to 20% by weight.

28. The acrylic premix according to claim 27, wherein said acrylic poly-functional monomer (a2) is present in an amount of from 1 to 10% by weight.

29. The acrylic premix according to claim 1, wherein two or more of said compounds of the formulae (I) to (IV) are present, with each having a formula different from the other.

30. The acrylic premix according to claim 29, wherein said two or more compounds comprise at least one compound of the formula (I) and another of the formula (II).

31. The acrylic premix according to claim 29, wherein said two or more compounds comprise at least one compound of the formula (I) and another of the formula (III).

32. The acrylic premix according to claim 29, wherein said two or more compounds comprise at least one compound of the formula (I) and another of the formula (IV).

33. The acrylic premix according to claim 29, wherein said two or more compounds comprise at least one compound of the formula (II) and another of the formula (III).

34. The acrylic premix according to claim 29, wherein said two or more compounds comprise at least one compound of the formula (II) and another of the formula (IV).

35. The acrylic premix according to claim 29, wherein said two or more compounds comprise at least one compound of the formula (III) and another of the formula (IV).

* * * * *